US009342781B2

(12) United States Patent
Cornebise et al.

(10) Patent No.: US 9,342,781 B2
(45) Date of Patent: May 17, 2016

(54) SIGNAL PROCESSING SYSTEMS

(71) Applicant: Google Inc., Mountain View, CA (US)

(72) Inventors: Julien Robert Michel Cornebise, London (GB); Danilo Jimenez Rezende, London (GB); Daniël Pieter Wierstra, London (GB)

(73) Assignee: Google Inc., Mountain View, CA (US)

( * ) Notice: Subject to any disclaimer, the term of this patent is extended or adjusted under 35 U.S.C. 154(b) by 287 days.

(21) Appl. No.: 13/925,637

(22) Filed: Jun. 24, 2013

(65) Prior Publication Data

US 2014/0279777 A1  Sep. 18, 2014

(30) Foreign Application Priority Data

Mar. 15, 2013  (GB) .............................. GB1304795.6

(51) Int. Cl.
*G06N 3/04* (2006.01)
*G06N 3/08* (2006.01)

(52) U.S. Cl.
CPC .............. *G06N 3/0454* (2013.01); *G06N 3/084* (2013.01)

(58) Field of Classification Search
CPC .................................................... G06N 3/0454
See application file for complete search history.

(56) References Cited

U.S. PATENT DOCUMENTS

2012/0072215 A1  3/2012  Yu et al.
2013/0262096 A1*  10/2013  Wilhelms-Tricarico ... G10L 25/90
704/202
2013/0325770 A1  12/2013  Heidasch

FOREIGN PATENT DOCUMENTS

EP  0360674  3/1990
EP  1638042  3/2006

OTHER PUBLICATIONS

Ranzato et al., "On deep generative models with applications to recognition," 2011 IEEE Conference on Computer Vision and Pattern Recognition (CVPR), Jun. 20, 2011, pp. 2857-2864.
Rezende et al., "Stochastic Backpropagation and Approximate Inference in Deep Generative Models," Proceedings of the 31$^{st}$ International Conference on Machine Learning, Jan. 16, 2014.
International Search Report and Written Opinion in International Application No. PCT/GB2014/050695, mailed Jan. 22, 2015, 19 pages.
Beal, "Variational algorithms for approximate Bayesian inference," PhD thesis, Gatsby Computational Neuroscience Unit, University College London, 2003, 281 pages.

(Continued)

*Primary Examiner* — Alan Chen
(74) *Attorney, Agent, or Firm* — Fish & Richardson P.C.

(57) ABSTRACT

We describe a signal processor, the signal processor comprising: a probability vector generation system, wherein said probability vector generation system has an input to receive a category vector for a category of output example and an output to provide a probability vector for said category of output example, wherein said output example comprises a set of data points, and wherein said probability vector defines a probability of each of said set of data points for said category of output example; a memory storing a plurality of said category vectors, one for each of a plurality of said categories of output example; and a stochastic selector to select a said stored category of output example for presentation of the corresponding category vector to said probability vector generation system; wherein said signal processor is configured to output data for an output example corresponding to said selected stored category.

24 Claims, 9 Drawing Sheets

(56) References Cited

OTHER PUBLICATIONS

Hinton et al., "Improving Neural Networks by Preventing Coadaptation of Feature Detectors," Arxiv: 1207.0580 v1, Jul. 3, 2012, 18 pages.

Jordan et al., "An introduction to variational methods for graphical models," Machine Learning, 1999, 37:183-233.

Salakhutdinov and Hinton, "Deep Boltzmann Machine", in Proceedings of the International Conference on Artificial Intelligence and Statistics, 2009, 5:448-455.

Search Report in United Kingdom Application No. 1304795.6, dated Aug. 14, 2014, 4 pages.

* cited by examiner

SIGNAL PROCESSING SYSTEMS

FIELD OF THE INVENTION

This invention generally relates to electronic hardware, software, and related methods for signal processing, in particular signals processing systems which generate data dependent on, and representative of, previously learnt example data.

BACKGROUND TO THE INVENTION

We will describe, in the main, signal processors which employ neural networks and other techniques to generate output data examples which match those previously learnt. For example the signal processor may be trained with many different examples of handwritten digits from zero to nine and may then be employed to randomly generate a new example from one of the learnt categories. Thus an output may be generated from a set of learnt distributions (of the training examples) and, in general, the categorisation of the training examples may also be learnt. We will also describe techniques which use an external input to select the category of output example generated, not by precisely specifying the category but instead by providing data which defines a 'context' for the training examples. The signal processor is trained using examples and their context and then afterwards context data can be used to bias the generation of output examples.

Signal processors of this general type have a range of applications. For example they can be used for prediction, with or without context, and thus have applications in many types of image and audio signal processing, as well as in control applications, for example predicting the position of a robot arm, as well as in other applications, for example evolutionary search techniques for, say, drug discovery. Embodiments of the signal processor/system may process data including, but not limited to: audio, video, image, game, sensor, actuator, control (including motor control), biological, physical, chemical, spatial, text, search, and other data.

It is known to use a Boltzmann machine to provide a so-called generative model as described, for example, in Salakhutdinov and Hinton, "*Deep Boltzmann Machine*", in Proceedings of the International Conference on Artificial Intelligence and Statistics, volume 5, pages 448-455, 2009. However Deep Boltzman Machines require a great deal of processing power to implement.

A Helmholtz machine can also be employed to provide a generative model, but whilst such machines have some interesting features in practice they learn very slowly and the output examples they generate are poor.

We will describe improved signal processors and related architectures which address both these problems.

SUMMARY OF THE INVENTION

According to a first aspect of the invention there is therefore provided a signal processor, the signal processor comprising: a probability vector generation system, wherein said probability vector generation system has an input to receive a category vector for a category of output example and an output to provide a probability vector for said category of output example, wherein said output example comprises a set of data points, and wherein said probability vector defines a probability of each of said set of data points for said category of output example; a memory storing a plurality of said category vectors, one for each of a plurality of said categories of output example; and a stochastic selector to select a said stored category of output example for presentation of the corresponding category vector to said probability vector generation system; wherein said signal processor is configured to output data for an output example corresponding to said selected stored category.

In embodiments the relationship between the category vector and the probability vector, and also the stored category vectors themselves, have been learnt by training the signal processor using a set of examples, as described further below. The training system may comprise part of the signal processor or the variable parameters in the signal processor may be trained when an instance of the signal processor is created, and afterwards the signal processor may operate independently of a training module/system. In some preferred implementations the probability vector generation system operates to translate between a probability vector defining the probability of a set of output data points (output vector) and a compressed representation of the probability vector as a category vector. Thus in embodiments a category vector is a compressed representation of a probability vector.

The data compression may be implemented using a neural network, in particular a deterministic (rather than stochastic) neural network. Employing a shared mapping system of this type reduces the number of parameters to be learnt by the signal processor since, in effect, the weights of the neural network are common to all the compressed representations (categories). Furthermore employing a deterministic neural network counterintuitively facilitates learning by facilitating a deterministic, closed-form calculation of the weights during training of the signal processor.

The skilled person will appreciate that, in this context, the reference to deterministic is to the weight calculation and does not preclude, for example, use of the 'dropout' technique to reduce the risk of complex co-adaptation where there are potentially many degrees of freedom (Hinton et al 'Improving Neural Networks by Preventing Co-adaptation of Feature Detectors', Arxiv: 1207.0580 v1, 3 Jul. 2012). More generally in this specification, where reference is made to a 'deterministic' neural network this should be taken to include, for example, a neural network which employs dropout or similar techniques to reduce overfitting during training.

As previously mentioned, preferably the probability vector generation system comprises a deterministic neural network, for example a non-linear multilayer perceptron. Here, by non-linear, it is meant that one or more layers of neurons in the network have a non-linear transfer function so that the network is not constrained to fit just linear data. The skilled person will recognise that, in principle, the mapping need not be performed by a neural network but may be performed by any deterministic function, for example a large polynomial, splines or the like, but in practice such techniques are undesirable because of the exponential growth in the number of parameters needed as the length of the input/output vectors increases.

Some preferred implementations of the signal processor include a context vector input to receive a context vector which defines a relative likelihood of each of the plurality of categories (for training examples and/or output examples). This may then provide an input to the stochastic selector so that the selection of a category of output example is dependent on the context (vector). Then the context vector, or data derived from the context vector, may be provided as a further input to the probability vector generation system, in embodiments as an additional vector input to the deterministic neural network. Thus an input layer of this network may have a first set of nodes to receive a category vector output from the memory storing these vectors, and a second set of nodes to receive the context vector.

In some preferred embodiments a length of the context vector may be different to the number of categories and a mapping unit is included to translate from one to the other. This mapping unit preferably comprises a second neural network, preferably a deterministic neural network, preferably non-linear (including a non-linear function applied to the signals from at least one layer of nodes). In embodiments this mapping unit comprises a second multilayer perceptron. The stochastic selector may then select a category according to a set of probabilities defined by a modified context vector of length K (the number of categories). In such a system, if there is no external context then the context vector, or the modified context vector of length K output from the mapping unit, may be defined to be constant (that is, setting the categories to be equally likely).

Where the context vector is not constant the context vector mapping neural network should have at least one hidden layer; similarly in embodiments the neural network in the probability vector generation system also preferably has at least one hidden layer although, depending upon the complexity of the data, two or more hidden layers may be preferable for this neural network. Providing a context vector input for the signal processor enables output examples from a learnt context to be provided. Although, typically, an output example may comprise a large number of data points (for example it may be an image), and the context vector will often be much shorter (for example 1-100 values), this is not essential. Thus in other implementations the context vector may be large, for example an image, and the output example small, for example defining a classification or category of the image. In this case the probability vector generation system may not be needed to provide data compression between the probability vector and category vector, in which case the probability vector generation system may, in effect, provide an identity operation (straight through connection). Data compression may then effectively be provided by the context vector mapping unit (A).

One particularly advantageous extension to the above described signal processor is to connect a sequence of the signal processors in a chain such that each successive signal processor receives a context vector from at least a previous signal processor in the chain, in embodiments from all the previous signal processors in the chain. More particularly, the context vector input to a signal processor in the chain may comprise data identifying the selection of the stochastic selector in the previous signal processor of the chain. In some sense this corresponds to a 'belief' the previous signal processor has regarding the output example to generate because what is provided is an example selected based on the likelihoods (distributions) it has learnt from the training examples. The selection of the stochastic selector may be provided to the next signal processor from various stages following the selection. Thus the information may be provided as a probability vector or as a category vector or, potentially, as a stochastic selection (sample) with data values chosen according to probabilities defined by the probability vector. It is preferable, however, to use the 'compressed' category vector level data as this reduces the number of parameters which the subsequent signal processor must learn and, in effect, leverages the compression mapping (MLP—multilayer perceptron—weights) learnt by the previous signal processor.

Thus it will also be appreciated that the output data from a signal processor for an output example may either comprise a category vector, or a probability vector (defining likelihood values for data points of the output example) which, if desired, may be employed for generating an output example. Additionally or alternatively the output may comprise an output example per se, with data point values selected stochastically according to corresponding probabilities defined by the probability vector.

Similarly the output from the chain of signal processors may either comprise a probability vector from the end processor of the chain and/or an output stochastic selector may be provided to generate an output example according to probabilities defined by this probability vector.

The skilled person will recognise that in a chain of signal processors the first signal processor in the chain may or may not have a context vector input, depending upon whether it is desired to make the signal processor chain dependent on an external context vector input.

The number of categories available in a signal processor is a design choice. In part this choice may be made dependent on a priori knowledge of the data—how many categories, very roughly, might be expected to be present. For example with learnt hand written digits 10 different categories would be expected, for digits 0-9. In general, however, it is advantageous to provide for a very large number of categories and, in effect, allow the training of the signal processor to determine how many categories are needed. In theory there is a risk of over-fitting with such an approach (in effect the signal processor may simply memorise the training examples). In practice, however, this is not necessarily a problem and if it was could be addressed by, for example, dropout or imposing a sparse representation (on one or both neural networks) or in other ways, for example by detecting over fitting and adjusting (reducing) a number of free parameters. Thus it is generally desirable to make provision for a large number of categories.

In one approach a large number of categories may be implemented on a single signal processor, but with more than a few thousand categories this becomes computationally expensive. Counterintuitively it is much more computationally efficient to implement a relatively small number of categories on each processor of a chain of processors: with this approach the effective number of categories grows exponentially with the number of processors in the chain (the number of levels) whilst the computational cost of sampling from the structure grows linearly with the number of processors (levels), and the computational cost of training the chain grows sub-linearly with the number of levels. For example with, say, 20 categories and four levels there are effectively $20^4=160,000$ categories. There is not complete equivalence with this same number of categories implemented on a single processor but there is very little decrease in flexibility for a huge saving in computational cost. By way of illustration consider an example with two categories on each processor: The first processor splits the data domain into two (in general divided by some complex surface), the second processor then splits each of these categories within the data domain into two, the third processor splits each of the domains created by the first and second processors into two, and so forth. In effect the context vector received by a processor labels which of the available regions generated by previous processors the current processor is to split the category vector inherited from the previous processor provides this information in compressed form (it represents, for example, a compressed form of the image it has chosen). One processor receives the category vector which, for say an image, defines a compressed image which the previous processor believes should be the output example, and this is combined with a belief of the present processor regarding the output example image, the present processor adding detail. This process continues down the chain with sequential refinement of the output example.

In a related aspect, therefore, the invention provides a signal processing system for generating output examples from categories of a plurality of categories, wherein a distribution of training examples across said plurality of categories has been learnt by said signal processing system, the signal processing system comprising: a chain of signal processors, wherein each signal processor of the chain has learnt a distribution of said training examples across a limited number of categories less than said plurality of categories; wherein at least each said signal processor after a first said signal processor in the chain has a context input and is configured to generate an output example from said learnt distribution conditional on said context input; wherein each successive signal processor in said chain receives the output example from the preceding processor in the chain as said context input; wherein a first said input processor in said chain is configured to stochastically select a said output example according to its learnt distribution; and wherein a last said signal processor in said chain is configured to provide one or both of an output example and a probability distribution for stochastically selecting a said output example.

In a further related aspect there is provided a method of signal processing to generate data for an output example from a plurality of learnt categories of training examples, the method comprising: storing a plurality of category vectors each defining a learnt category of training example; stochastically selecting a stored said category vector; generating a probability vector, dependent upon said selected category vector; and outputting data for said output example, wherein said output example comprises a set of data points each having a probability defined by a respective component of said probability vector.

As previously described, in some preferred embodiments of the method selection of a stored category vector is dependent upon category likelihoods defined by a context vector, in particular one provided by a preceding signal processor in a chain of signal processors.

In embodiments the stored category vectors and probability vectors, more particularly the probability vector generation system, comprise, that is are defined by, a learnt representation of real-world data. More generally the (output example) data may comprise one or more of: image data, sound data, signal data, sensor data, actuated data, spatial data, text data, game data and the like embodiments of the signal processor may be employed to generate/predict/classify or otherwise process such data.

A signal processor/method as described above may be implemented in hardware, for example as electronic circuitry, or in software, for example as code running on a digital signal processor (DSP) or on a general purpose computer system, or in a combination of the two. As the skilled person will appreciate, the signal processing we describe may be distributed between a plurality of coupled components in communication with one another. Processor control code and/or data (for example learnt parameter data) to implement embodiments of the invention may be provided on a physical (non-transitory) data carrier such as a disc, programmed memory, for example non-volatile memory such as Flash, or in Firmware. Code and/or data to implement embodiments of the invention may comprise source, object or executable code in a conventional programming language (interpreted or compiled) such as C, or code for a hardware description language such as Verilog.

The invention also provides a method of training a signal processor, signal processing system, or method, in particular as previously described, the method comprising: presenting training examples to the signal processor system or method, wherein a said training example comprises a set of data points corresponding to data points of a said output example; computing from a said training example a set of responsibility values, one for each said category, wherein a said responsibility value comprises a probability of the training example belonging to the category, each category having a respective stored category vector; computing a gradient vector for a set of parameters of the signal processor, system or method from said set of responsibility values, wherein said set of parameters includes said stored category vectors and defines a shared mapping between said stored category vectors and a corresponding set of said probability vectors defining probability values for a said set of data points of a said output example; and updating said set of parameters using said computed gradient vector.

Embodiments of this training procedure are efficient in part because the category vectors represent a compressed version of the data, say image, space represented by the probability vectors. Because of this and, in embodiments, because the neural network between the category and probability vectors provides a shared parameterisation for the training examples, learning is relatively quick and computationally efficient. In effect the category vectors provide a reduced dimensionality codebook for the examples, say images.

Broadly speaking a responsibility value defines the likelihood of a category given an example set of data points; in embodiments this is computed from the probability of the set of data points given a category (preferably normalised by summing over all the available categories). In preferred embodiments the responsibility value is also conditional on the context vector so that parameters are learnt based on a combination of training examples and their context vector data. In embodiments the learnt set of parameters comprises the context vectors stored in memory (one per category) and the weights of the two neural networks, for the context and category vectors respectively (MLPs A and B later). The skilled person will appreciate that the aforementioned probability of an example set of data points given a category and context vector is a probability of the example given a category vector, context vector, and weights of the neural network connecting these to a probability vector, that is B(m,c). The skilled person will further appreciate that the calculation of this probability will depend upon the implementation of the neural network and also on the type of data. For example for binary data a binomial distribution applies and if $b_i$ is the probability of bit i then:

$$p(x_i|B(m,c)) = b_i^{x_i}(1-b_i)^{1-x_i} x_i \in \{0,1\}$$

Ideally, when computing the gradient vector this would be computed over the entire set of training examples, but in practice one example or a 'minibatch' of a few examples is sufficient to provide a noisy but usable approximation to what the gradient would be if integrated over the full set of training examples. When updating the parameters the gradient vector is multiplied by a step size ($\eta$). In theory different step sizes may be employed with different parameters and $\eta$ may be a diagonal or full matrix, but in practice this does not appear necessary. Since there may be many thousands of parameters (the parameters include the weights of the neural networks) it is convenient to chose the step size as a constant small number, say 0.001 (although, again, in theory the step size could be reduced towards 0 as training progresses, for example as a function of iteration number). In practice it is useful to chose a step size to be as large as practicable without the training procedure failing. Broadly speaking averaging the gradient vector over a minibatch corresponds to a change in step size.

Merely to give a feel for the numbers which may be involved, the output neural network (B) may have of order 10 input side nodes (category vector and context) and of order 1000 nodes in each of two hidden layers and an output 'visible' layer. The input side neural network (A) may have of order 100-1000 input layer (context vector) nodes, of order 1000 hidden layer nodes, and a number of output nodes equal to the number of categories, depending on the implementation say 10-10000. In some implementations the context vector may have length one, that is it may comprise a single, scalar value. As previously mentioned, a category vector may be relatively compressed, for example having a length of order 1-100.

The above described training procedure can straightforwardly be extended to a chain of processors since, in effect, each processor may be trained independent of the others except that it inherits a sample stored category vector from one (or all) previous signal processors in the chain. This sample is made stochastically, with the probability of selecting a category vector dependent on a corresponding responsibility value. Thus in this manner responsibilities are inherited from one processor in the chain to another although, in embodiments, a computed gradient vector is not inherited or shared between signal processors of the chain. In a modification of the procedure a gradient vector may be computed for a context vector of a processor of the chain and this may then be shared, more particularly accumulated, from one processor in the chain to a subsequent processor in the chain.

The previously described signal processors/systems may be considered as an architecture in which a stochastic node or nodes (the stochastic selection step of 1 of K categories, is followed by a deterministic neural network (B), which is then followed by a stochastic output stage (stochastic selection of a set of data points according to a probability vector). This concept may be extended and generalised to provide a neural network architecture in which a (large) deterministic neural network is sandwiched or interleaved between layers of stochastic nodes. Such an approach can address previous difficulties with slow/poor training of deep stochastic neural networks.

Thus in a further aspect the invention provides a neural network architecture, the architecture comprising: a first, input layer of stochastic nodes; a second, output layer of stochastic nodes; and a deterministic neural network connected between said input and output layer nodes.

Embodiments of this structure may be employed to propagate signals (features) both up and down through the layers of the deep neural network. Thus the structure is able to implement a (modified) Helmholtz machine which addresses the defects in conventional Helmholtz machines—which has stalled research in this field for a decade or more—providing both extremely fast, and also accurate, sampling.

Broadly speaking the deterministic neural network (which may optionally be sparse and/or employ dropout) learns an efficient representation of features from amongst training examples from which the stochastic neural network nodes can then select. For example the deterministic neural network may learn to distinguish between a man and a woman and thus, implicitly, the stochastic nodes are forbidden from selecting both a man and woman simultaneously, which is desirable real-world behaviour. By contrast without the deterministic intermediate structure a complicated set of interrelationships between features of say male and female faces would need to be learnt.

In embodiments the deterministic neural network includes one, two or more hidden layers, and in preferred implementations is non-linear as previously described.

BRIEF DESCRIPTION OF THE DRAWINGS

These and other aspects of the invention will now be further described, by way of example only, with reference to the accompanying figures in which.

DETAILED DESCRIPTION OF PREFERRED EMBODIMENTS

Figure 1A:
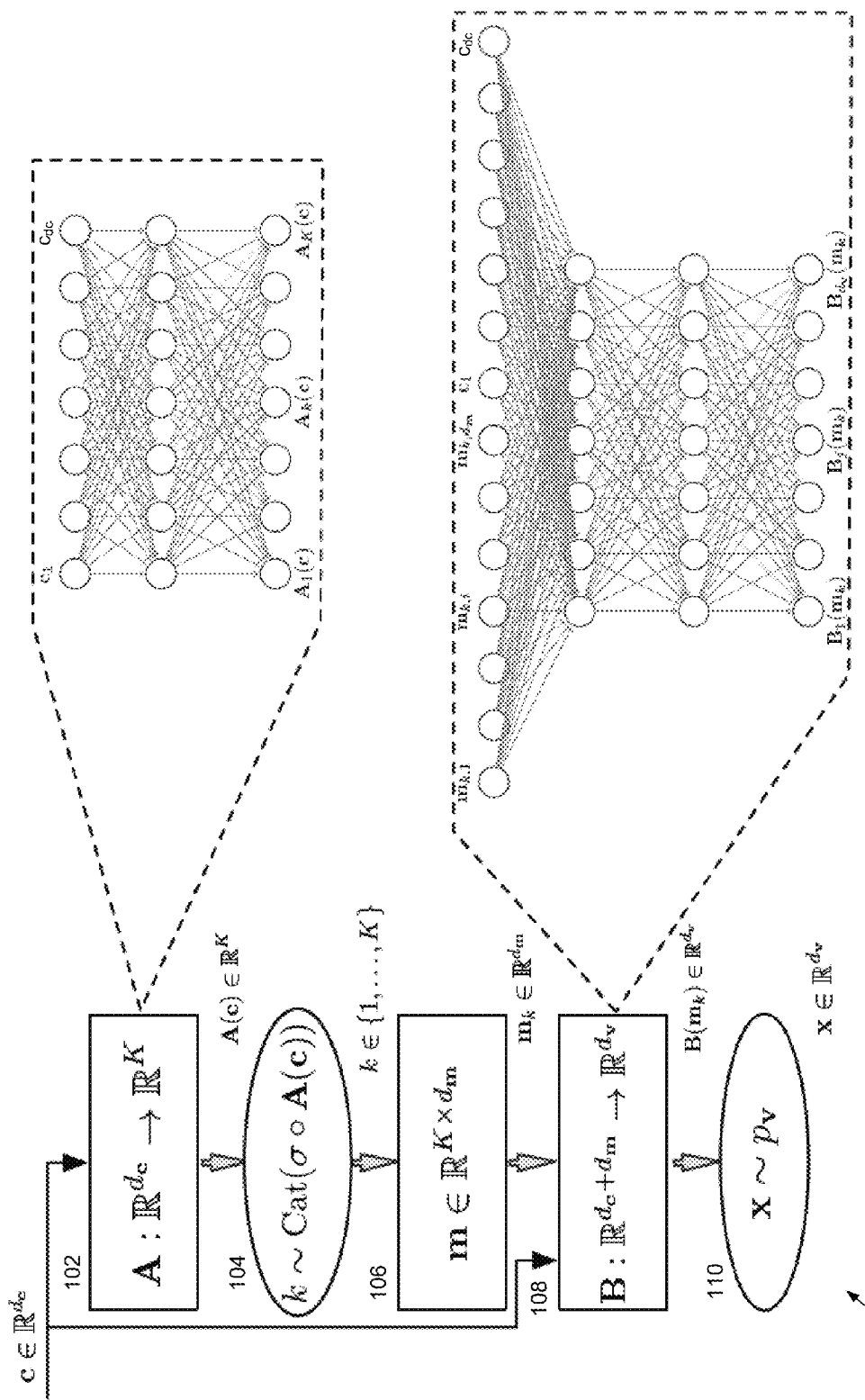
FIGS. 1a to 1c show, respectively, a flow diagram of a signal processing method/system according to an embodiment of the invention, a neural network architecture according to an embodiment of the invention, and an example deterministic neural network for the method/system/architecture of FIGS. 1a and 1b.

Broadly speaking we will describe signal processing techniques which we term Compressed Mixtures and, for their powerful extension, Chained Compressed Mixtures. We will describe the structures and procedures implementing these techniques, and the algorithms by which the signal processors can be trained on real observed samples (learning) so that they can generate new, similar, samples (sampling). One advantage of Compressed Mixtures is that they can "imagine" very fast yet very accurately. Further, in embodiments all the required computations are available in closed form, allowing efficient learning.

As used herein, a generative model (GM) is computational machinery that learns to imagine. Its main purpose is to generate samples similar to those that it has observed.

More precisely, a GM is trained by observing a sequence of samples from an unknown real-world probability distribution, and generates new samples from an approximation to this probability distribution. For example, the GM may be shown images from the NORB (New York University Object Recognition Benchmark) dataset which contains around 200,000 images of 50 different objects, and may then learn to generate new example images which look like the objects. As used herein, a Conditional Generative Model (CGM) additionally learns to generate new samples conditionally on a given context, that is, some data which accompanies the observation. Each observation can have its own context. Different contexts correspond to different distributions of the observations, and a CGM learns this and, given any specific future context, will generate new samples corresponding to the distribution associated with this context. For example, the context may specify the conditions under which an image was captured.

In general learning and sampling can be intertwined: sampling from the model can be done at any time; and it is possible to refine the model by learning from additional observations without needing to restart from scratch. Conversely, it is also possible to keep sampling without seeing any new observations: New observations are not necessary to generate new samples, thus allowing an extensively trained GM to be used in practical settings where its generative abilities are needed. Thus, for example, a signal processor implementing a generative model may be trained during some initial "calibration" stage, storing the learnt parameters in non-volatile memory, and may then be used as a self-contained module without its training system.

Because the Compressed Mixtures we describe can operate efficiently on very high-dimensional observation spaces, they are suitable to many domains of applications. The samples, observed or generated, can for example be either large static objects, as large as images, or entire time-series of smaller-dimensional objects where the high dimensionality stems from the number of time steps actually represented in a single observed series. The example training and output data values can be categorical (selected from a discrete number of categories), binary, discrete (eg 0-255), or even continuous. Some example applications are described later.

In broad terms we will begin by describing our "CMix" architecture and components, then how to sample from, and train this architecture. We then discuss some of its limitations and how these can be addressed by chaining multiple CMix processors, and describe how the chain of processors is trained.

Compressed Mixture Processor (CMix)

A Compressed Mixture (CMix) signal processor defines a distribution, or a conditional distribution where context data is employed, over the sample space.

1. Notation

We consider an arbitrary d-dimensional sample space $\Omega^{d_v}$. The space $\Omega$ is problem-specific, for example $\Omega=\{0,1\}$ in black and white images, $\Omega=\{0, \ldots, 255\}$ in grey-scale images, or more generally $\Omega=\mathbb{R}$ (ie is the set of real numbers).

We denote by x~p the sampling of a realization of a random variable x from a probability distribution p(·). With a slight abuse of notation we do not distinguish between a random variable and its realization, nor between a distribution with its density.

Composition of functions is noted by $f \circ g(x) := f(g(x))$.

Vectors and matrices are represented in boldface, e.g. x. The i-th component of vector x is denoted in subscript $x_i$, while the i-th row of a matrix m is noted $m_i$. The vector of the components 1, 2, . . . , i−1 of x is noted $x_{<i}$. Superscript indexing $x^i$ serves to denote a sequence of vectors.

2. Architecture

Referring to FIG. 1a, this shows the architecture of a Compressed Mixture processor according to an embodiment of the invention. Square boxes represent deterministic transformations, while ellipsoids represent sampling a random variable from a given distribution. The dashed boxes are expanded visions of the corresponding square box, illustrating an MLP (multilayer perceptron) in each.

In some preferred embodiments at the top of a CMix is vector $c \in \mathbb{R}^{d_c}$ (that is, a vector of dimension (length) $d_c$), we refer to as the context vector, input vector or conditioning vector. This represents the exogenous information we want to condition the sample on. It can be ignored (for example taken as constant) for a non-conditional generative model.

The density of the generative distribution for any datapoint x in the visible space $\Omega^d$ conditional on a context vector c, is:

$$p(x \mid c) = \sum_{k=1}^{K} p(x \mid k, c) p(k \mid c), \qquad (1)$$

where p(x|k,c) is a probability distribution on the visible space $\Omega^{d_v}$, and p(k|c) is a categorical distribution over the index of classes $\{1, \ldots, K\}$. Namely, the probability of occurrence of any class index k between 1 and K is defined as:

$$p(k|c) = Cat(k|\sigma \circ A(c)), \qquad (2)$$

$$= \sigma_k \circ A(c) \qquad (3)$$

where $\sigma_k(x) = \exp x_k / \Sigma_j \exp x_j$ is the k-th component of the classical softmax function and A is a multilayer perceptron (MLP) with the appropriate input and output dimensions for $d_c$ and K. There is no specific constraint on their number of hidden layers and hidden units.

Similarly, the distribution p(x|k,c) on the visible space is such that its sufficient statistic is the output of a second MLP B:

$$p(x|k,c) = p(x|B(c, m_k)) \qquad (4)$$

where $m_k$ is the k-th row of a matrix $m \in \mathbb{R}^{K \times d_m}$. We refer to the rows of the matrix m are as embeddings.

The CMix model thus defines a mixture model of the "visible" distributions p(x|k,c), where the parameters of the components are shared through the MLPs A and B.

In embodiments the MLP B defines a non-linear compression between the dimension (length) $d_v$ of the output example vector and the dimension (length) $d_m$ of the category vector or embedding stored in matrix m. Referring to FIG. 1a, in block 102 MLP A converts the context vector of dimension $d_c$ to a vector of dimension K, where K is the number of categories of example employed by the signal processor. As previously mentioned, K may be chosen based on the application, or simply to be large or, in a chain as described later, to provide a large number of categories for the chain. MLP A preferably has at least one hidden layer; preferably this has a larger number of nodes than c, and preferably also a larger number of nodes than K.

In block 104 the "~" indicates that a k is chosen to choose a category: there are K categories and k takes a value indicating one of these. In embodiments, therefore, k may be represented by a vector of length K in which every component has a value of 0 except for component k, which may have a value of 1. All components may have an equal probability of being selected. Alternatively the context vector c, via A and σ, may define, for each component of the vector, the probability of that component have a value of 1 (the probabilities being normalised so that the sum of these probabilities is equal to 1).

Block 106 represents a memory storing matrix m. This may be implemented as a table comprising K rows of data, each row storing $d_m$ values, one for each component of a category vector or "embedding". One of these rows, and hence a category vector or embedding $m_k$, is selected by the value of k. The category vector or embedding in effect represents a compressed representation of output example data from the processor.

In block 108 MLP B receives the category vector or embedding as an input together with, where used, the context vector c (or data derived from this). MLP B translates this input into a probability vector p (p in equation (4) above; $p_v$ in FIG. 1a, the "v" denoting the "visible" nodes of B), which has a dimension (length) $d_v$ equal to the number of data points in the desired output example. For example, for an image with 4096 pixels, $d_v$ would have length 4096.

The output of MLP B defines a probability (of a value, say 1 or 0) for each data point $x_i$ of an output example. This probability vector may be used as the output from the signal processor as it effectively provides a representation of the output example (for example, for a processor trained on the NORB dataset, as described later, $p_v$ effectively provides a greyscale image of one of the 50 model objects). However in embodiments an output example is generated, as indicated in block 110, by stochastically sampling this probability distribution i.e. values for data points are chosen according to the probability defined for each by $p_v$. By contrast, in the chained processors described later, the compressed representation $m_k$ is used as the output example data from the processor.

The dimension (length) $d_m$ of the category vector or embedding $m_k$, is chosen according to the desired or sustainable degree of compression of the training/output data. Thus $d_m$ may be chosen with some knowledge of the degree of compression which is potentially applicable to the dataset used with the processor and/or by routine experiment. In embodiments a high degree of compression is employed between $d_v$ and $d_m$—for example with images compression by two or three orders of magnitude or more may be employed. However it is not essential for any compression to be employed—for example for a processor in a classification application the context vector may have the dimension of the image and the number of output data points/nodes may be low (one with, say, a continuous value, or a few, to classify the input into a few classes). In general, however, a significantly compressed representation is desirable.

The MLP B preferably has at least one hidden layer, and works best with two or more hidden layers. Preferably the number of nodes in its hidden layer(s) is at least equal to $d_v$.

Extended Architecture

The architecture of FIG. 1a may be considered as employing a pair of stochastic layers (indicated by ellipses in FIG. 1a), the output stage 110 and the stochastic selection stage 104—although selection stage 104 effectively comprises just a single stochastic node which may take 1 of K values.

Figure 1B:
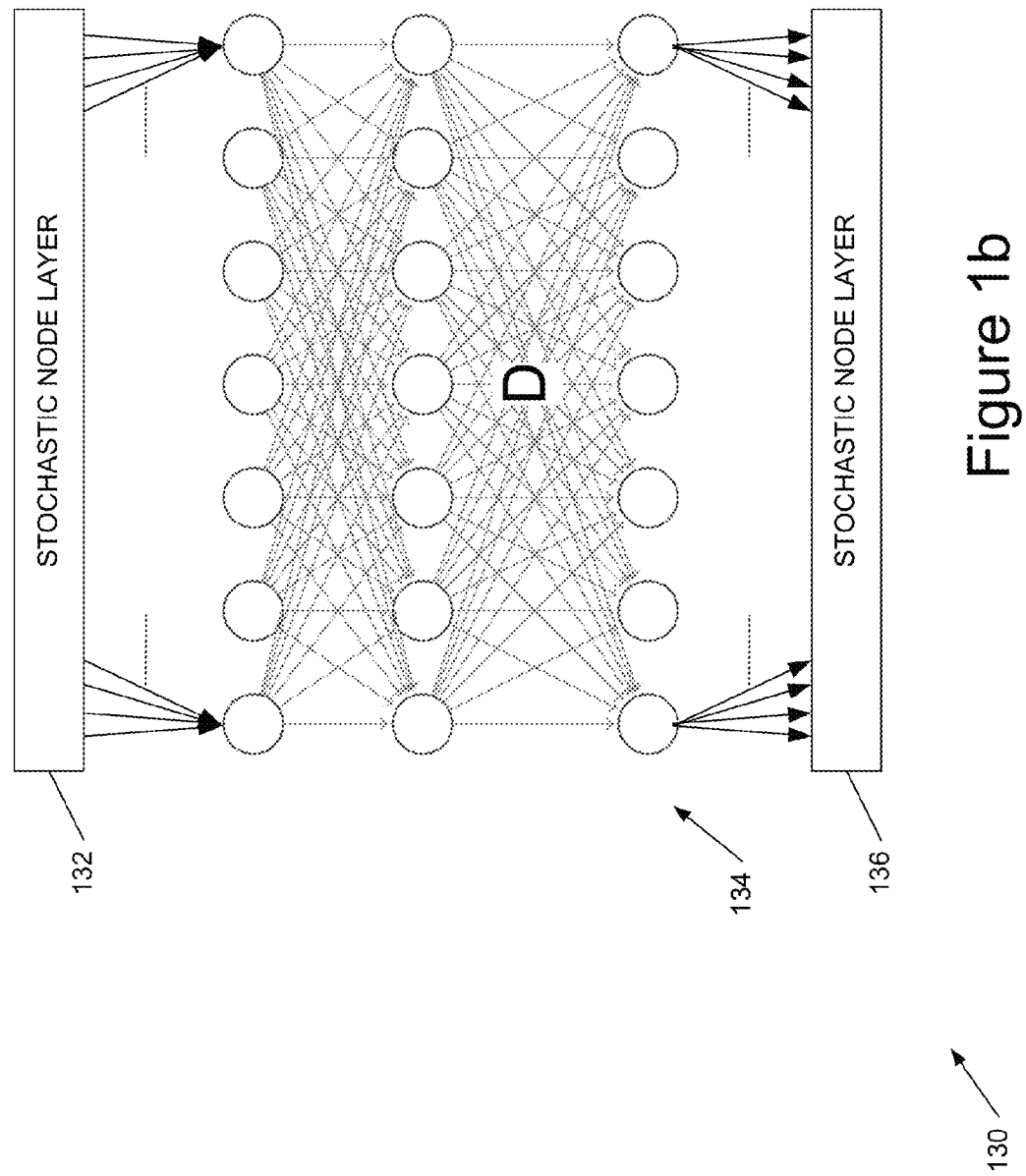

This architecture may be extended to the more general architecture of FIG. 1b. Thus FIG. 1b shows a neural network 130 comprising a first stochastic layer 132, for example an input layer, a second stochastic layer 136, for example an output layer, and a deterministic neural network, D, 134 connected between the stochastic layers.

In FIG. 1b the connections shown between nodes are illustrative only—the connections between nodes of different layers may be global or local. In the stochastic layers the node values may be drawn randomly from/in accordance with a probability distribution which may be defined, for example, by a weight matrix multiplying a non-linear function such as a sigmoid operating on an input vector.

Broadly speaking, the deterministic neural network D, learns to map features of the training data to patterns with the correct frequencies. Consider, for example, a simple version of D with 4 binary output nodes, which can therefore represent 16 patterns: if, say, a particular pattern should appear ¼ of the time the structure of FIG. 1b will learn to map ¼ of the training data features to the same pattern. It will be appreciated that if D is made sufficient large then any mapping is possible. The structure will allocate the correct mapping for the correct frequencies of patterns.

Advantageously this structure may be employed to implement a Helmholtz machine-type training procedure, but other training procedures may also be employed. The deterministic nature of D simplifies training (in effect back-propagation may be employed to train D), avoiding the problems that occur with stochastic nodes in a Helmholtz machine, which result in a noisy gradient vector and thus very slow or stalled learning.

Preferably D is large and/or deep, that it is preferably has a large number of nodes in its one or more hidden layers, and/or two, three or more hidden layers. This provides greater representational power for the distribution(s), twisting and expanding these to a larger representational space. It may be constrained to be sparse (only a relatively small percentage of neurons activated by any particular feature, for example less than 20%, 15%, 10% of the neurons having greater than a threshold activation) and/or employ dropout. In effect, D acts as a feature learner for the training data and the stochastic layers operate on these learnt features.

Multilayer Perceptron (MLP)

An example deterministic neural network which may be used in the architectures of FIGS. 1a and 1b, for A, B and/or D is the multilayer perceptron (MLP). The skilled person will be aware of such devices (and further details can be found in, for example, C. M. Bishop, "Neural networks for pattern recognition", Oxford University Press, 1995) but for completeness we will outline an example structure.

A multilayer perceptron (MLP) is a deterministic function with a specific parametric structure alternating linear and non-linear operations, making it a universal function approximator: it can approximate any real-valued multivariate deterministic function $f: R_c^d \rightarrow R_v^d$, as long as it has been trained with enough couples $c, f(c)$.

Figure 1C:
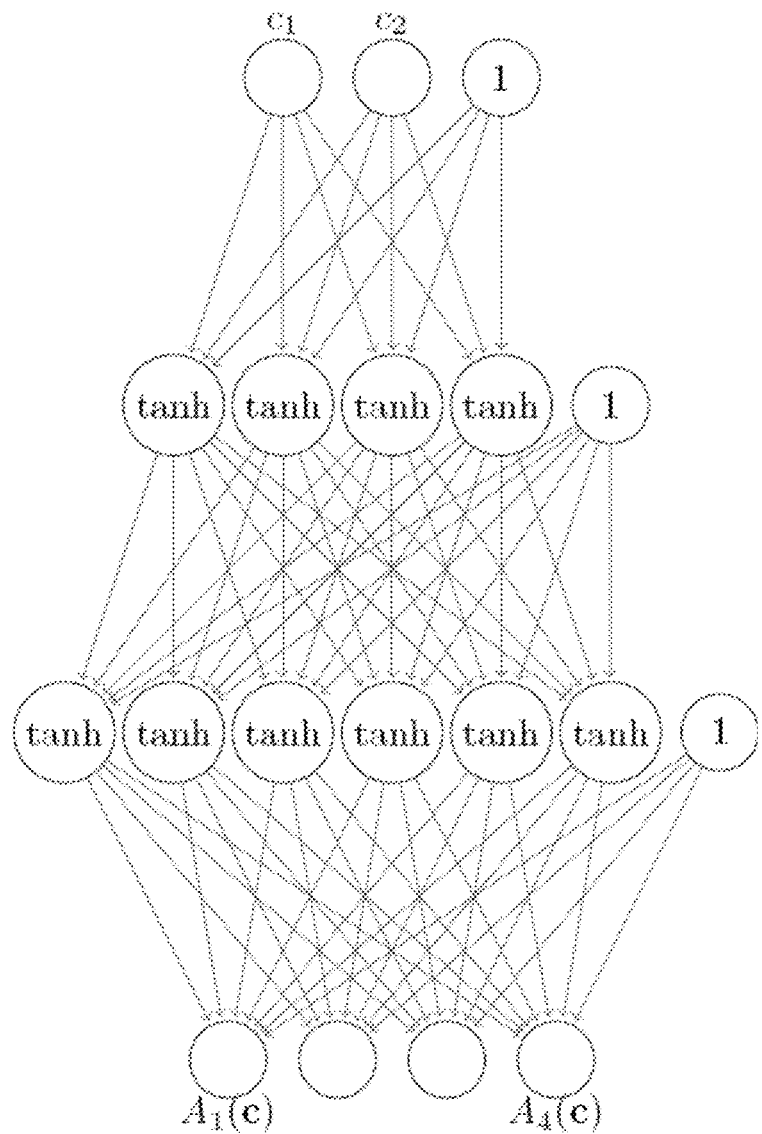

FIG. 1c shows an example architecture of a MLP. This MLP has an input layer containing 2 units plus a bias unit, two hidden layers containing 4 and 6 units plus a bias unit each, and an output layer containing 4 units, with no bias needed at the output. (In principle a bias unit enables the representation of the constant term in y=mx+c but in practice the bias units are optional, particularly in larger neural networks with many nodes in a layer). In FIG. 1c arrows represent linear combinations, i.e. multiplications by a given weight and summation of all incoming arrows. Circles represent scalar units. Units labelled tan h operate a non-linear transformation of their input; units labelled 1 are constant bias units. The vector $c=(c_1,c_2)$ is the input, while the output is collected into the vector $A(c)=(A_1(c), \ldots, A_4(c))$.

More formally, a MLP is a composition of linear and non-linear operations on spaces of arbitrary dimensions, each such space being usually named a layer, and each component of each space being named a unit. A MLP A from $R_c^d$ to $R_v^d$ will therefore have one input layer with $d_c$ unit, 1 output layer with $d_v$ units, and an arbitrary number $n_H$ of intermediate hidden layers of dimensions $d_{H,1}, \ldots, d_{H,n_H}$. Its precise form is the following composition of linear functions $H^k$ and non-linear functions $\sigma^k$:

$$A(c) := H^{n_H+1} \circ \sigma^{n_H} \circ H^{n_H} \circ \sigma^{n_H-1} \circ H^{n_H-1} \ldots \sigma^1 \circ H^1(c).$$

The functions $H^k$, for any k in $\{1, \ldots, n_H+1\}$, are affine transformations from $R^{d_{H,k-1}}$ to $R^{d_{H,k}}$ where $d_{H,0}:=d_c$ and $d_{H,n_H+1}:=d_v$. More precisely, with a slight abuse of notation, we identify the function with a $d_{H,k} \times (d_{H,k-1}+1)$ matrix and define for any x in $R^{d_{H,k-1}}$:

$$H^k(x) := H^k \begin{pmatrix} x \\ 1 \end{pmatrix}.$$

The components of the matrices $H^1 \ldots H^{n_H+1}$ are the weights of the MLP, and are the free parameters that are trained by gradient ascent to approximate the function of interest.

The functions $\sigma^k$ are non-linear functions from $R^{d_{H,k}}$ to $R^{d_{H,k}}$, an activation function or "squashing function" since some common choices map to $[0,1]^{d_{H,k}}$. They are typically chosen as component-wise application of the hyperbolic tangent tan h or of the logistic sigmoid $1/(1-\exp(-x))$. This activation function is not applied to the output of the last hidden layer, to allow the output of the neural network to take any value in $R^{d_v}$. In practice, the choice of the number of hidden layers $n_H$, of their numbers of units $d_{H,k}$, and of the activation functions $\sigma^k$ may be chosen by trial and error and practical considerations.

Training a MLP to approximate a function $f$ amounts to choosing the adequate weights, i.e. the components of the matrices $H^1 \ldots H^{n_H+1}$. This is typically achieved by solving the minimization problem $$\underset{A}{\operatorname{argmin}} \sum_{(x,f(x))} E(A(x), f(x))$$

where the sum is over a training dataset of known pairs $(x,f(x))$, and $E(A(x),f(x))$ is an error function that measures the divergence between $A(x)$ and the known outputs $f(x)$. This error function is, for example, a least-square error or a logarithmic loss function. The optimization algorithm employed to solve $$\underset{A}{\operatorname{argmin}} \sum_{(x,f(x))} E(A(x), f(x))$$

is usually one of many variants of gradient ascent, evaluating the partial derivatives $$\frac{\partial E(A(x), f(x))}{\partial H_{ij}^k}$$

by cautious application of the chain-rule of derivation. Such evaluation of the derivatives is referred to as back-propagation of the error.

3. Sampling

Referring again to the Compressed Mixture (CMix) signal processor of FIG. 1a, we now describe a procedure for producing samples from this processor. This is a straightforward application of Equations (1), (3) and (4), and the sampling procedure is detailed in Algorithm 1, below, in terms of samples from a categorical distribution and from the p distribution:

---
Algorithm 1 - Generating a sample from a compressed mixture
---
function GENERATESAMPLE(c)
    p ← σ ∘ A(c)
    k ~ Cat(p)
    x ~ p(• | B(c,$m_k$))
    return x,$m_k$
end function
---

Here, in k~Cat(p) "~" denotes choosing a k from a set of K numbers according to probabilities p, as previously described. It will be appreciated that in this sampling procedure c and $m_k$ are known (from previous training).

For future convenience (i.e. use in a CMix chain), the procedure GENERATESAMPLE returns both a visible sample from the CMix model and the row in the embedding space which served to generate it, but in general the algorithm may return one or more of x, $m_k$, p(•|B(c,$m_k$)) (the final sampling step x~p(•|B(c,$m_k$)) is optional). Optionally c may be constant, in which case the output represents the learnt values without context. As previously mentioned, p(•|B(c,$m_k$)) may be discrete, continuous, bounded etc, in general any distribution whose sufficient statistics are those of an MLP, i.e. any distribution representable by the output of a MLP.

4. Learning

The CMix processor may be trained by learning the optimal value of its parameters using an online EM (expectation-maximisation) algorithm, which takes a straightforward form for this processor.

Here θ is a vector of all parameters in the CMix, i.e. the weights in the MLP A, the matrix m and the weights in the MLP B. It will be appreciated that there may be many thousands of such parameters.

For any given data sample x, the first step of the EM procedure is to compute the gradient $G^\theta(x,c)$ of log p(x|c) with respect to the parameters θ:

$$G^\theta(x, c) = \nabla_\theta \log p(x \mid c) \tag{5}$$

$$= \nabla_\theta \log \sum_k p(x, k \mid c) \tag{6}$$

$$= E[\nabla_\theta \log p(x, k \mid c) \mid x] \tag{7}$$

$$= \sum_{k=1}^{K} p(k \mid x, c) \nabla_\nabla [\log p(x \mid k, c) + \log p(k \mid c)]. \tag{8}$$

Equality (7) is an application of the Fisher identity (see e.g. O. Capp_e, T. Ryden, and E. Moulines, "Inference in hidden Markov models", Springer, 2005, proposition 10.1.6, p. 353). (The notation in (8) with x on both sides of "|" denotes fixing x to its value on the right hand side and integrating).

The posterior mixture weights p(k|x,c), are referred to as the responsibilities of each component of the mixture, and are the posterior distribution of the latent categorical index conditionally on the observation x and the context c:

$$p(k \mid x, c) = \frac{p(x \mid k, c) p(k \mid c)}{\sum_{j=1}^{K} p(x \mid j, c) p(j \mid c)}. \tag{9}$$

The second step of the EM algorithm then proceeds to maximizing log p(x), hence the name M-step. We simply increment the parameters θ in the direction given by $G^\theta$. Algorithm 2 describes this procedure, with the optional improvement that it accumulates the gradient over a mini-batch of several randomly sampled observations before proceeding to the M-step. A typical minibatch size may be of order 1-10 examples.

---
Algorithm 2 Training the Compressed Mixture
---
1: function TRAINCMIX( )
2:     while ISLEARNING( ) do
3:         ZEROGRADPARAMETERS( )
4:         $\{x^i, c^i\}_{i=1}^{N}$ ← GETNEWDATAMINIBATCH( )
5:         for i ← 1 . . . N do
6:             ACCUMULATEGRADIENTS($x^i, c^i$)
7:         end for Algorithm 2 Training the Compressed Mixture

```
 8:         UPDATEPARAMETERS( )
 9:     end while
10: end function
11: function ZEROGRADPARAMETERS( )
12:     G^θ ← 0
13: end function
14: function UPDATEPARAMETERS( )
15:     θ ← θ + ηG^θ
16: end function
17: function ACCUMULATEGRADIENTS(x, c)
18:     r ← COMPUTERESPONSIBILITIES(x, c)
19:     G^θ ← G^θ + Σ_{k=1}^K r_k ∇_θ [log p(x|k, c) + log p(k|c)]
20:     G^c ← Σ_{k=1}^K r_k ∇_c [log p(x|k, c) + log p(k|c)]
21:     return G^c,
22: end function
23: function COMPUTERESPONSIBILITIES(x, c)
24:     s ← 0
25:     for k ← 1 . . . K do
26:         r_k ← p(x|k, c)p(k|c)
27:         s ← s + r_k
28:     end for
29:     return r/s
30: end function
31: function SAMPLEEMBEDDINGFROMPOSTERIOR(x, c)
32:     r ← COMPUTERESPONSIBILITIES(x, c)
33:     k ~ Cat(r)
34:     return m_k
35: end function
```

The algorithmic complexity of a single training step of the CMix model scales as O(K), i.e. linearly with the number of categories K. The procedure ACCUMULATEGRADIENTS at line 17 of Algorithm 2 can (optionally) return the gradient $G^c$ of log p(x) with respect to the context c (to allow propagation of the gradient through a Cmix chain). The gradient $G^θ$ is not explicitly shown as being returned because, in embodiments, this is a global parameter of the algorithm. The vector of parameters θ may be initialised with random values; the parameter η represents the learning rate of the algorithm, and may be chosen by experiment. The responsibility vector r is preferably returned normalised (that is, divided by sum s as shown). The function SAMPLEEMBEDDINGFROMPOSTERIOR is included in Algorithm 2 although it is not part of the training procedure, because it is used later when chaining CMix processors.

In line 19, the calculation of $G^θ$ employs a calculation of p(x|k,c) and of p(k|c). The term p(k|c) may be determined from equation (3) (knowing the weights of A; and c). The term p(x|k,c) may be determined using equation (4), where x is known (a training example), c is known, and $m_k$ and the weights of B are known (these are the parameters being optimised). The particular form of the calculation of p(x|k,c) depends on the type of distribution of x—for example whether it is Bernoulli ($x_i$ is 0 or 1), Binomial ($x_i$ is in the range 0 to 255, say), or Gaussian. An equation for p(x|k,c) may be determined analytically, for example by hand (in equation (4) we know the inputs to B and the probability is linear on the output of B), but in practice this always takes a simple form, linear (or for a Gaussian, polynomial) on x, and a function of a logarithm of B. Some examples are given below:

Bernoulli Case:

$$x_i \in \{0, 1\}$$

$$\log p(x|k, c) = \sum_{i=1}^{d} [x_i \log g(B(m_k, c)) + (1 - x_i)\log(1 - g(B(m_k, c)))]$$

$$g(x) = \frac{1}{1 + \exp(-x)}$$

Binomial Case:

$$x_i \in \{0, N\}$$

$$\log p(x|k, c) = \sum_{i=1}^{d} [x_i \log g(B(m_k, c)) + (N - x_i)\log(1 - g(B(m_k, c)))]$$

Compressed Mixture Processor Chain (CMixChain)

In practice the above described Compressed Mixtures are limited in the number of distinct samples they can generate by the processing cost. The number K of mixture components in the top layer is arbitrarily chosen and it could theoretically be very large without any impact on the constant O(1) number of operations (algorithmic cost) required for sampling, this being O(1). However, the number of operations of a single learning step grows as O(K), i.e. linearly with the number of categories, making very large numbers of categories impractical.

We now describe techniques employing chained compressed mixture processors, which alleviate this problem by using the combinatorial explosion of successive compressed mixtures: the first level in the chain provides its sampled category as part of the context of the second level, which in turns passes this and its own sampled category as part of the context of the third level, and so on up to an arbitrary L levels. In practice a small number of levels have proven remarkably powerful. The cost of sampling grows as O(L) with L being very moderate, while the learning cost grows as $O(L^2 \times K^{1/L})$, i.e. sub-linearly with the number of actual categories. Thus by chaining CMix processors a large increase in the number of actual categories that can be sampled from can be obtained, while keeping a scalable training cost using approximation in the EM algorithm by inheriting sampled categories as described.

Figure 2:
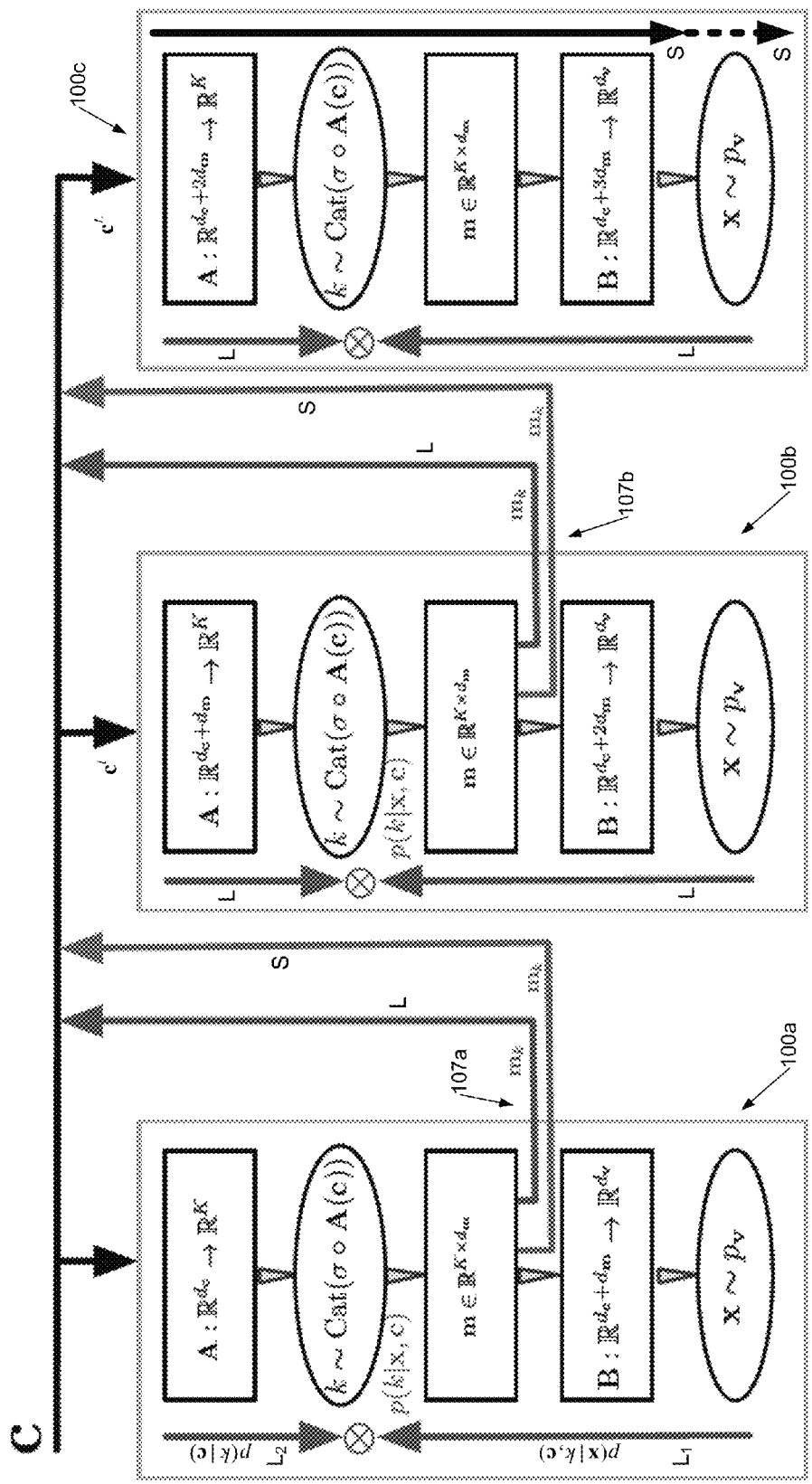
FIG. 2 shows a signal processing system comprising a chain of signal processors, according to an embodiment of the invention.

FIG. 2 shows the architecture of a signal processing system 140 comprising a chain of compressed mixture signal processors 100a,b,c. Apart (optionally) from the last, each compressed mixture signal processor has an output 107a,b to provide its chosen context vector or embedding $m_k$ to the next processor in the chain; this is concatenated into the context vector provided to the next stage. In FIG. 2 the solid arrows indicate the information flow for sampling (red, S) and during learning (blue, L). The calculation of responsibility p(k|x,c) from p(x|k,c) (arrow $L_1$) and p(k|c) (arrow $L_2$) is shown as a multiplication but will in general also involve a summation (for normalisation, as shown in line 27 of Algorithm 2). Although for convenience of representation the same internal dimensions (vector lengths) are suggested for the chained signal processors there is no obligation for these to be the same for each CMix processor—for example the processors could have different category vector/embedding dimensions $d_m$. and/or the sizes of the neural networks A and/or B could grow with progression down the chain. As indicated by the dashed line accompanying the sampling information flow in the final stage 100c, the output from the chain may be a stochastically selected output example or a probability vector defining probabilities of data points for such an output example.

1. Architecture

Continuing to refer to FIG. 2, a CMix processor chain is constructed from a sequence of L CMix processors indexed by l=1 . . . L, referred to as the levels in the chain. A key feature of the chain of processors is that each successive CMix in the chain is conditioned on the samples of the preceding CMix processors, as illustrated, yielding a sequential refinement of the generated samples.

Note that $A^l$, $m^l$, and $B^l$ denote the components of the CMix of level l, and $k=(K_1 \ldots k_L)$ is the concatenation of all indices $K_l \in \{1, \ldots, K_l\}$ in the CMix of all levels in the chain, with a total of L levels. Each level can have a different number $K_l$ of categories. In embodiments the parameters $A^l$, $m^l$, and $B^l$ belong to signal processor l in the chain, and each signal processor has its own parameters (matrix memory (m) and MLP weights).

We can write the joint distributions of any such vector, regardless of the architecture, as the product of sequential conditionals:

$$p(k \mid c) := \prod_{l=1}^{L} p(k_l \mid k_{<l}, c), \tag{10}$$

where $p(k_l|k_{<l},c)$ are conditional categorical distributions defined similarly to (3), and <l denotes the previous signal processors in the chain.

We define a CMixChain conditional distribution over $\Omega^{d_v}$ as $$p(x \mid c) = \sum_{k} p(x, k \mid c), \tag{11}$$

where $$p(x, k \mid c) = p(x \mid k, c) p(k \mid c) \tag{12}$$

$$= p(x \mid k, c) \prod_{l=1}^{L} p(k_l \mid k_{<l}, c) \tag{13}$$

and the distributions $p(x|k,c)$ and $p(k_l|k_{<l},c)$ are parameterized as $$p(x|k, c) = p(x|B^L(c^L)), \tag{14}$$

$$p(k_\ell|k_{<\ell}, c) = p\big(k_\ell|\sigma \circ A^\ell(c^{\ell-1}, m_{k_\ell}^\ell)\big), \tag{15}$$

$$\tag{16}$$

where $$c^0 := c \tag{17}$$

$$C^l := (c, m_{k_1}^1, \ldots, m_{k_l}^l) \text{ for all } l \geq 1 \tag{18}$$

is the concatenation of the original context c and the embeddings chosen in the successive categories up to and including level l. That is, at each level l the l-th CMix receives as input the concatenated sampled memories $(c, m_{k_1}^1, \ldots, m_{k_{l-1}}^{l-1})$ of all preceding CMix in the chain together with the global context c. Preferably the size and/or number of hidden layers in the neural nets $A^l$ and $A^l$ is increased as the level depth l increases, to accommodate the growing size of the input.

2. Sampling

As illustrated in FIG. 2, sampling from the CMixChain is performed by sequentially sampling and concatenating the embeddings (category vectors) $m_k$ from the successive CMix levels until reaching the last level, which is then entirely sampled though. This procedure is detailed in Algorithm 3, below, which uses the GENERATESAMPLE procedure from Algorithm 1, for a single CMix processor, to return a value x dependent on context c. In Algorithm 3 the returned embedding is denoted e.

| Algorithm 3 Sampling from the CMixChain model |
|---|
| 1: function GENERATESAMPLE(c) |
| 2:　　for l = 1 → L do |
| 3:　　　　x, e ← CMix$^l$:GENERATESAMPLE(c) |
| 4:　　　　c ← (c, e) |
| 5:　　end for |
| 6:　　return x |
| 7: end function |

Figure 3A:
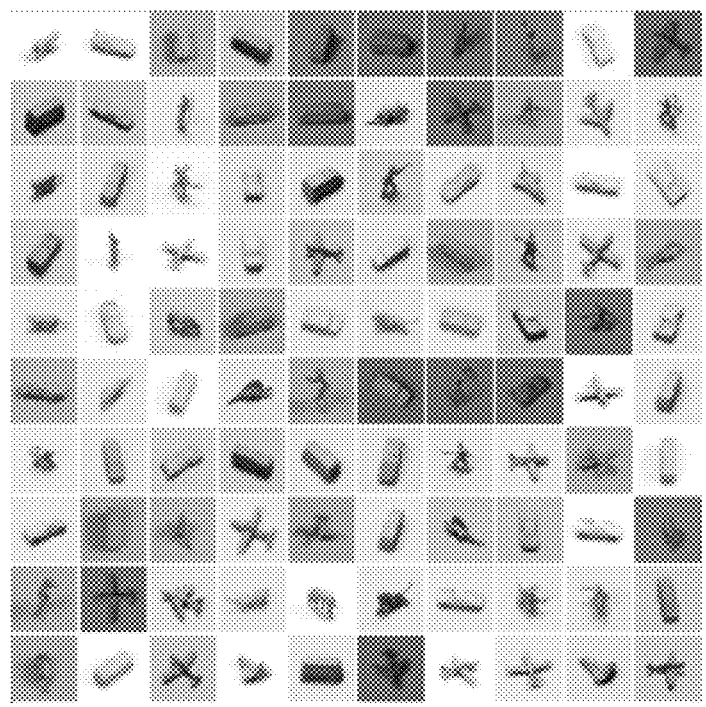
FIGS. 3a and 3b show, respectively, a selection of examples from a set of training data, and a plot of values of K=100 category vectors or embeddings each having a dimension $d_m$=2 and comprising two real, continuous values illustrating a compressed representation of the dataset from which the examples of FIG. 3a are drawn, the 2D coordinates of each point representing an image.
Figure 3B:
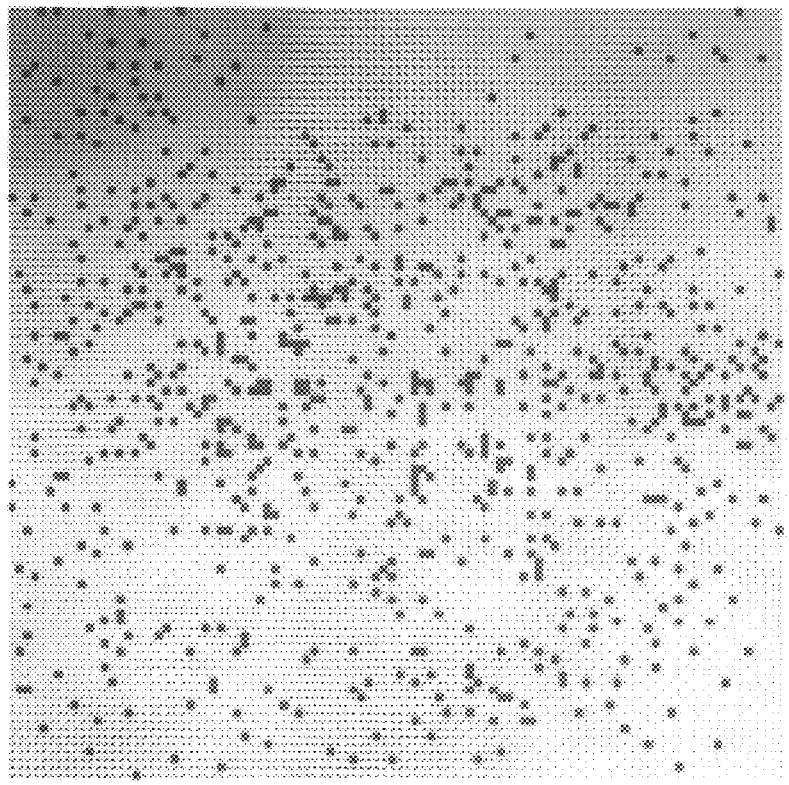

FIG. 3a shows observed samples from the NORB dataset used to train a CMixChain. To aid in understanding the operation of an example single CMix processor, FIG. 3b shows a set of compressed representations of images from the dataset of FIG. 3a, for a CMix processor with K=100 categories, each with category vector or embedding with a dimension $d_m=2$—that is each image of the training dataset is compressed such that it is represented by just two continuous real values. FIG. 3b plots points identified by these two continuous values, using these values as x- and y-coordinates, and plotting 100 points, one for each category.

Figure 4:
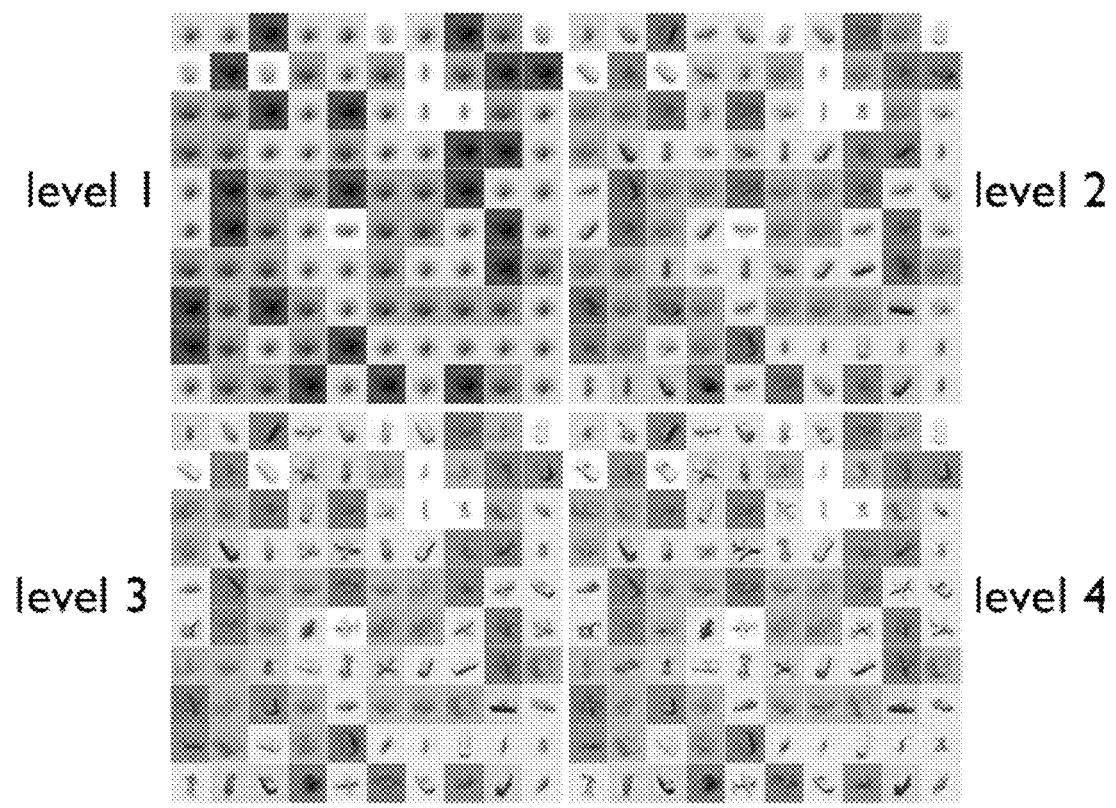
FIG. 4 shows output examples generated by successive signal processors in a chain of signal processors according to an embodiment of the invention.

FIG. 4 shows output examples generated by successive signal processors at levels l=1, 2, 3, 4 in a CMixChain of signal processors comprising 10 categories per level and 4 levels. These can be compared with the examples of FIG. 3a, and illustrate the successive details typically added by each level in the chain. FIG. 4 is to aid understanding of the operation of the chain—in an embodiment of the signal processing chain only the output from the final processor of the chain would be provided externally.

3. Learning

Learning in the CMixChain model employs an approximation of the previously described EM procedure. Algorithm 4, below, details this training procedure; the underlying mathematical basis is described later. The complexity of this approximated algorithm scales as $O(LK(d_c+d_v)+L^2(K+d_m))$ instead of the $O(K^L(d_c+d_v+d_m))$ which would be the cost of the exact algorithm—i.e. the computation cost scales as $L^2K$ rather than as $K^L$.

| Algorithm 4 Learning in the CMixChain model |
|---|
| 1: function TRAINCMIX( ) |
| 2:　　while ISLEARNING( ) do |
| 3:　　　　ZEROGRADPARAMETERS( ) |
| 4:　　　　$\{x^i, c^i\}_{i=1}^N$ ← GETNEWDATAMINIBATCH( ) |
| 5:　　　　for i ← 1 . . . N do |
| 6:　　　　　　ACCUMULATEGRADIENTS($x^i$, $c^i$) |
| 7:　　　　end for |
| 8:　　　　UPDATEPARAMETERS( ) |
| 9:　　end while |
| 10: end function |
| 11: function ZEROGRADPARAMETERS( ) |
| 12:　　for l ← 1 . . . L do |
| 13:　　　　CMix$^l$:ZEROGRADPARAMETERS( ) |
| 14:　　end for |
| 15: end function |
| 16: function UPDATEPARAMETERS( ) |
| 17:　　for l ← 1 . . . L do |
| 18:　　　　CMix$^l$:UPDATEPARAMETERS( ) |
| 19:　　end for |
| 20: end function |
| 21: function ACCUMULATEGRADIENTS(x, c) |

| Algorithm 4 Learning in the CMixChain model |
| --- |
| 22:       $G^c \leftarrow 0$ |
| 23:       for l ← 1 ... L do |
| 24:           F ← CMix$^l$:ACCUMULATEGRADIENTS(x, c) |
| 25:           $G^c \leftarrow G^c + F_{\leq d_c}$ |
| 26:           e ←CMix$^l$:SAMPLEEMBEDDINGFROMPOSTERIOR(x, c) |
| 27:           c ← (c, e) |
| 28:       end for |
| 29: end function |

Algorithm 4 uses the functions defined in Algorithm 2 for a single CMix processor; $G_\theta$ does not appear explicitly because it is part of the global parameters of a single CMix, although as previously mentioned, each CMix has its own set of parameters $\theta^l$ and gradient vector $G_\theta^l$ which, in embodiments, is not inherited from one CMix signal processor to the next. Thus in embodiments each CMix processor is trained independently and just the context vector c is inherited.

In Algorithm 4 the ACCUMULATEGRADIENTS function for $G_c$ (the gradient with respect to the context c) is not required for the chain of signal processors and "memory" from the previous level is provided by inherited context. In principle, however, $G_c$ could be used to inherit more information from one level to the next.

Learning Formalism

To facilitate understanding we will now outline a mathematical justification for the training procedure of Algorithm 4 for a chain of CMix processors.

For simplicity, we derive here the computations in the case where the number of categories $K_l = K$ is constant across all layers. Extension to the general case is straightforward.

The algorithmic complexity of a single training step of the CMixChain model scales quadratically with l as $$O(LK(d_c + d_v) + L^2(K + d_m)), \quad (24)$$

whereas that of a single CMix unchained with an equivalent number $K^L$ of total categories would scale exponentially with l as $$O(K^L(d_c + d_v + d_m)). \quad (25)$$

We recall that the gradient of the log-likelihood of a datapoint x associated to a generative model p(x,k) with latent variables k can always be expressed as an expectation under the posterior over the latent variables $$\nabla \log p(x) = \nabla \log \sum_k p(x, k) \quad (26)$$

$$= E_{p(k|x)}[\nabla \log p(x, k)], \quad (27)$$

that is, computing the gradient $\nabla \log p(x)$ requires the knowledge of the posterior distribution p(k|x).

In the following we introduce a variational approximation q(k|x,c) to the posterior p(k|x,c) and a way of training its internal parameters in order to achieve the desired scaling properties (see, for example, M. J. Beal, "Variational algorithms for approximate Bayesian inference", PhD thesis, Gatsby Computational Neuroscience Unit, University College London, 2003; and M. I. Jordan, Z. Ghahramani, T. S. Jaakkola, and L. K. Saul, "An introduction to variational methods for graphical models", Machine Learning, 37:183-233, 1999).

The variational framework replaces the problem of maximizing the data log-likelihood $$\theta^* = \underset{\theta}{\mathrm{argmax}} \sum_x \log p_\theta(x) \quad (28)$$

$$= \underset{\theta}{\mathrm{argmax}} \sum_x \log \sum_k p_\theta(x, k), \quad (29)$$

with a nested minimization $$(\theta^*, Q^*) = \underset{\theta, Q}{\mathrm{argmin}} E_Q[\log Q(k \mid x) - \log p_\theta(x, k)] \quad (30)$$

$$= : \underset{\theta, Q}{\mathrm{argmin}} F \quad (31)$$

where Q is a distribution over the latent variables k referred to as a variational distribution and F is defined as the variational free energy.

For the model defined in Equation (13), we start by defining a variational distribution Q(k|x,c) in a factorized form $$Q(k \mid x, c) := \prod_{l=1}^{L} Q_l(k_l \mid x, c, k_{<l}). \quad (32)$$

The free energy associated to this variational posterior is given by $$F = E_Q[\log Q(k|x,c) - \log p(x,k|c)] \quad (33)$$

Minimizing F with respect to $q_l$ under the constraint that it is a probability distribution yields the closed-form solution $$Q_l^*(k_l | x, k_{<l}, c) \propto p(k_l | k_{<l}, c) \exp \{E_{Q^*}[\log p(x|k,c)|k_{\leq l}]\}, \quad (34)$$

where ∝ denotes equality up to a normalization constant. This result can be written as $$Q_l^*(k_l \mid x, k_{<l}, c) = \frac{p(k_l \mid k_{<l}, c) f_l(x \mid c, k_{\leq l})}{\sum_{j=1}^{K} p(k_l = j \mid k_{<l}, c) f_l(x \mid c, k_{<l}, k_l = j)} \quad (35)$$

where the quantity $$\eta_l(x|c, k_{\leq l}) := \exp\{E_{Q^*}[\log p(x|k,c)|k_{\leq l}]\} \quad (36)$$

can be seen as an unnormalized distribution over the visible x conditionally on the c and on the chosen categories $k_l$ from the variational distribution up the l-th level.

The variational posterior distribution Q* obtained in this manner would correspond exactly to the true posterior p(k|x, c). We can as well identify the correspondence between the solution (35) and more common forward-backward algorithms by noting that the first factor in the numerator of Equation (35) is a backward recursion, while the second factor is a forward simulation of Equation (10) as indicated below:

$$Q_l^*(k_l \mid x, k_{<l}, c) \propto \underbrace{p(k_l \mid k_{<l,c})}_{\text{forward}} \underbrace{\exp\{E_{Q^*}[\log p(x \mid k, c) \mid k_{\leq l}]\}}_{\text{backward}}. \quad (37)$$

The next step of our derivation is to approximate the expectation $$E_{Q^*}[\log p(x|k,c)|k_{\leq l}]. \quad (38)$$

Since this expectation depends only on $Q_{l'}^*$ for $l'>l$, we could obtain the exact $Q_l^*$ by solving recursively the equations for $Q_{l'}^*$ starting at the last level $l=L$ and going back to the first level $l=1$. This exact solution is not tractable, having an algorithmic complexity $O(K)$. Moreover, the EM algorithm is modifying the parameters of $p(x|k,c)$ so that $f_l(x|c,k_{\leq l})$ defined in Equation (36) approaches the empirical distribution. This learning goal is the same as for the EM iterations for a single CMix model. Therefore, we can adopt the following approximation:

$$E_{Q^*}[\log p(x|c,k)|k_{\leq l}] \approx \log p^l(x|k_{\leq l}, c), \qquad (39)$$

where $p^l(x|k_{\leq l}, c)$ is the observation model of the l-th CMix model in the chain.

Replacing this approximation into Equation (35) yields $$Q_l^*(k_l | x, k_{<l}, c) = \frac{p(k_l | k_{<l}, c) p^l(x | k_{\leq l}, c)}{\sum_{j=1}^{K} p(k_l = j | k_{<l}, c) p^l(x | k_{<l}, k_l = j, c)}. \qquad (40)$$

The approximated solution (40) for $Q^*$ has the same form as the posterior distribution of a single CMix model given in Equation (9). It therefore allows us to re-use the distribution $p^l$ as well as the machinery to learn it inside each CMix in the CMixChain in a modular manner.

The full variational distribution $Q^*$ thus becomes $$Q^*(k | x, c) \approx \prod_{l=1}^{L} p(k_l | x, k_{<l}, c), \qquad (41)$$

where $p(k_l|x,k_{<l},c)$ is computed internally by the l-th CMix model given the currently observed data sample x and the input from all the precedent CMixes in the chain concatenated with the global context c. The maximization in Equation (31) with respect to the remaining parameters not belonging to Q is performed by gradient ascent of Equation (27), where each parameter update may be computed using a single sample from Q. The resulting procedure is detailed in Algorithm 4.

Example Implementation

Figure 6:
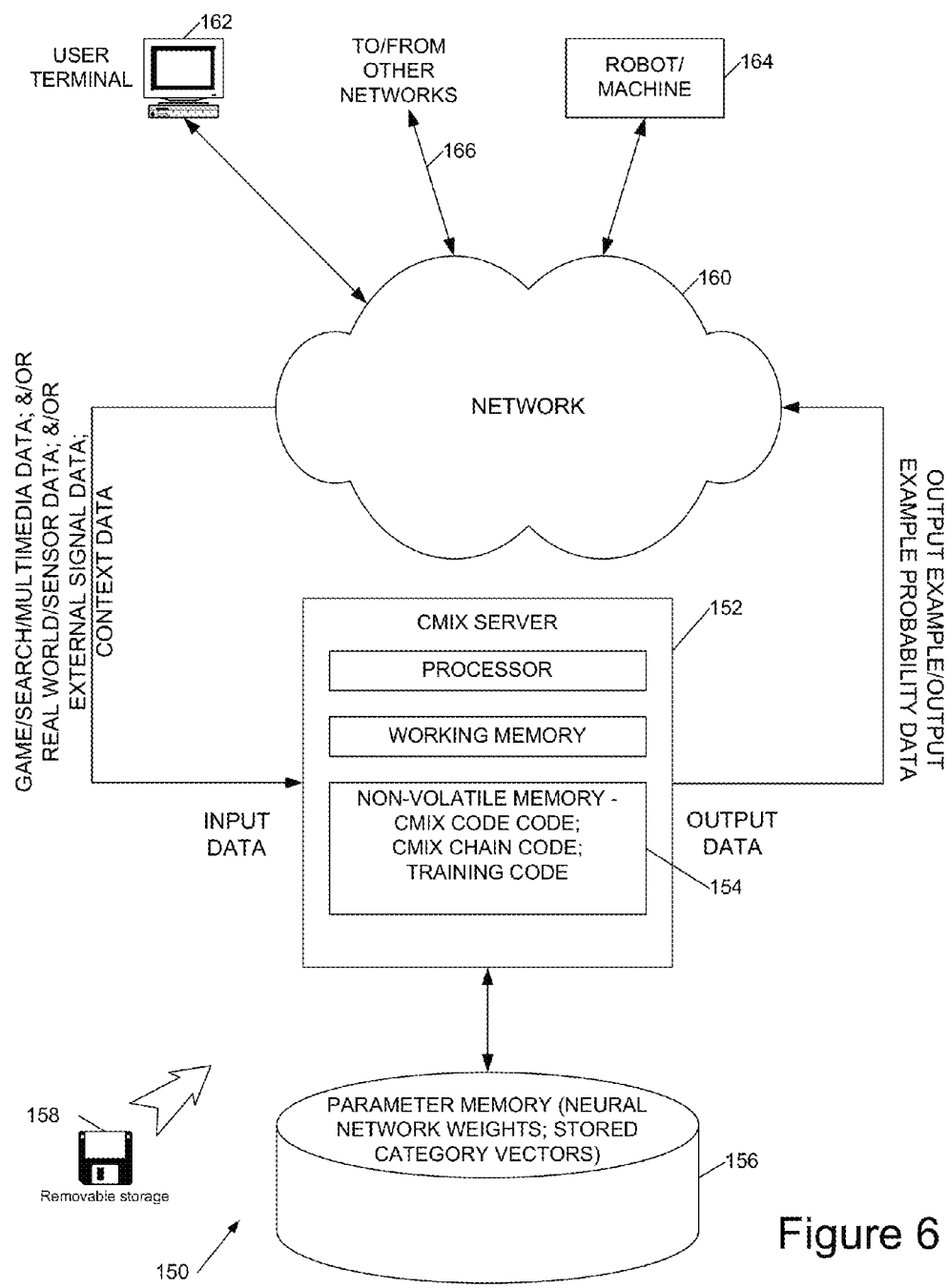
FIG. 6 shows an example of a computer system programmed to implement the signal processors/processing chain of FIGS. 1 and 2.

FIG. 6 shows a schematic block diagram of the structure of electronic hardware/software modules to implement a CMix signal processor 100 as previously described.

Thus the context data c is provided to a context vector mapping unit 112, implemented by MLP A, as well as to MLP B of a probability vector generation system 118; these correspond to block 102 and 108 of FIG. 1a and implement corresponding functions. The context data is also provided to a training module 122.

The mapping unit A provides a K-wide output to a stochastic category selector 114, which has a function corresponding to block 104 of FIG. 1a, and this in turn provides category selection data, for example in the form of an index or address, to category (embedding) vector memory 116 storing matrix m.

Memory 116 provides a $d_m$-wide output to probability vector generation system 118, having a function corresponding to block 108 of FIG. 1a and implemented by MLP B. System 118 also receives context vector c, and provides a $d_v$-wide probability vector output to an optional stochastic output selector 120, which samples from the distribution defined by the probability vector $p_v$ to provide a sampled output example x (corresponding to block 101 of FIG. 1a).

Training module 122 receives training data on input 124, and optionally context data c, and implements the training procedure of Algorithm 2 to update the weights of MLP A (parameters $\theta_A$), the weights of MLP B (parameters $\theta_B$), and the category vectors or embeddings stored in memory 116 (parameters $\theta_m$). Training module 122 need not be part of the signal processor 100—for example the parameters θ could be trained by an external system which is afterwards removed, or the signal processor may be merely programmed with predetermined values, for example storing these into permanent memory such as read-only memory, non-volatile RAM such as Flash™, or on a disk.

Figure 5:
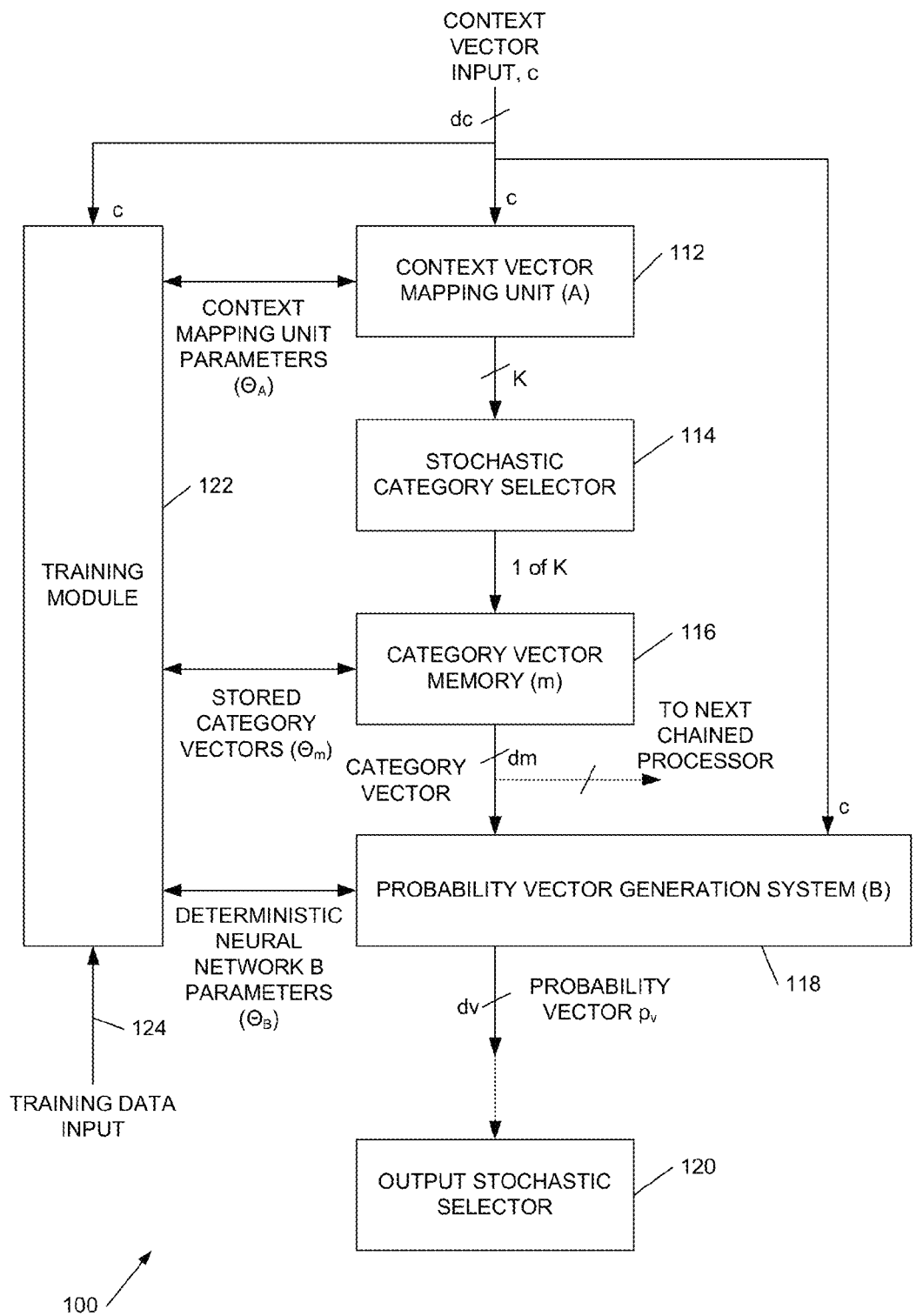
FIG. 5 shows a block diagram illustrating a signal processor structure/architecture according to an embodiment of the invention.

The skilled person will appreciate that the structure of FIG. 5 may be implemented in electronic hardware/circuitry. For example it may be defined in a hardware definition language and complied into hardware, or it may be implemented in an ASIC or FPGA. Alternatively some or all of the illustrated blocks may be implemented using a program-controlled signal processor, which may form part of the hardware, for example by including a processor block on an ASIC/FPGA. Alternatively the structure of FIG. 5 may be implemented by software modules running on a digital signal processor (DSP) or on, say, a graphics processing unit (GPU). Still further alternatively the structure of FIG. 5 may be implemented on a general purpose computer system, or across a plurality of coupled computing systems, for example implementing a high performance computing system.

FIG. 6 shows a general purpose computer system 150 programmed to implement a chain of CMix signal processors as illustrated in FIG. 2. Thus the computer system comprises a CMix server 152 including a processor and working memory. Server 152 also includes non-volatile memory 154 storing processor control code to implement a plurality of CMix signal processors 100 of the type shown in FIGS. 1a and 5, as well as code to sample from the CMix chain to provide an output, and code to implement the training procedure of Algorithms 2 and 4. Server 152 is also coupled to non-volatile storage 156 which stores weights for neural networks A and B and the embeddings of matrix m. The code/data in memory 154 and storage 156 may be provided on a removeable storage medium, illustratively shown as disk 158.

The CMix server 152 is provided with input data, optionally with associated context data. The input data may be of any type include but is not limited to one or more of: game/search/multimedia data, real-world/sensor data, and external signal data. Applications also include time-series data, training on a temporal series of examples, albeit the examples may be treated as effectively independent rather than as a time-series succession per se. Such time series data may be of any type including the aforementioned types, as well as time-series image (video) data, audio data, weather and other physical/chemical and/or biological data, financial data, and so forth. The neural network server 152 similarly provides corresponding output data, based on the training examples it has learnt and optionally context data provided to the server.

A user, and/or robot/machine, and/or other computer system(s)/CMix processor(s)/chain(s) may interact with the neural network server 152 to provide input data and/or receive output data via network 160, which may include the Internet. By way of illustration, a user terminal 162, robot/machine 164 and link to other network(s)/computer system(s) 166 are shown in FIG. 6.

Example Applications

The CMix signal processors we describe can be employed in a wide range of domains and provide good representative power combined with rapidity of sampling. We describe below some example applications in which these features are advantageous; these merely illustrative and are non-exhaustive. A CMix processor may be trained in a supervised or unsupervised manner.

1. "Imagining" Elements from a Category

Straightforward sampling from the learned conditional distribution p(x|c) can be used to simulate imagination: When trained on labelled data, learning with the label as context c and the object as sample x, sampling from p(x|c) outputs example data for, or "imagines", an object from a given category.

2. Classifying Objects Amongst Categories

Conversely, training a CMix processor (or chain) with the label as observation x and the object as the context c, then sampling from p(x|c) turns the CMix processor into a classifier, predicting the category of an unlabelled object.

For example in a supervised training process for recognising the digits 0-9 it may be known that a particular image corresponds to, say, a "2" and the CMix processor may be trained with the image as the context and x denoting the recognised digit. In such a case x may be a scalar variable with a range of values denoting different digits, or it may be, say, a vector of length 10 with binary-valued components.

3. Completion

Figure 7:
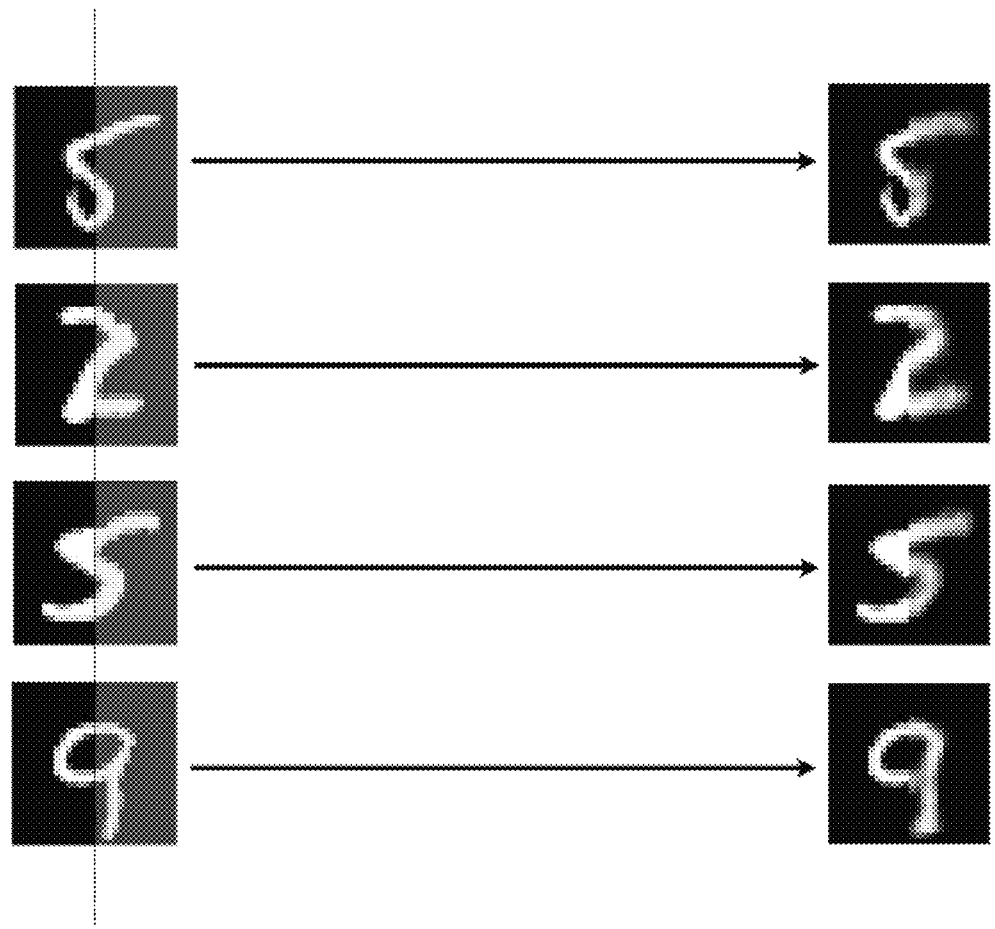
FIG. 7 shows output examples generated by a chain of signal processors according to an embodiment of the invention, illustrating image completion.

In another example application a CMix processor or chain can observe part of an image, and be asked to "imagine" or complete the full-image which best matches the partial image provided. Thus FIG. 7 shows examples of image completion by a CMixChain. This illustrates, on the left, 4 test samples (never seen by the model before) to be completed. The yellow region (to the right of the dashed line) indicates the pixels that have been occluded to the model. On the right is shown the CMixChain's "best guess" for the occluded pixels—it can be seen that the result is representative of the occluded portion of the input to be completed. This technique can also be applied to completion of time series for missing data, smoothing, and the like.

In more detail, completion involves sampling from another conditional than p(x|c). Instead, for a given context c, we observe only a part $x_v$ of the object (e.g. half of the pixels in the image) while the rest of the image, $x_h$ is hidden from view. Here v and h are two disjoint sets of indices such that $x=(x_v, x_h)$. The only requirement is that the hidden part $x_h$ and the visible part $x_v$ are independent of each other conditionally on the context and the category; that is, the distribution p(x|k,c) can be factorized as $$p(x|k,c)=p(x_v|k,c)p(x_h|k,c). \quad (19)$$

Such a factorization is typically the case in image generation without lateral connection in the bottom layer of the neural net B. For example the distribution of Equation (4) factorizes as a product over the pixels where each pixel follows for example a Bernoulli or a Binomial distribution whose parameter is the output of the MLP B:

$$p(x|B(c,m_k)) = \prod_{i=1}^{d_v} p(x_i|B_i(c,m_k)). \quad (20)$$

By way of illustration two examples are given:

Black and White Image:

if we are modelling a vector x of binary data $x_i \in \{0,1\}$, for example pixels in a black and white image, we map each output unit $B_i$ of the MLP B to the interval [0,1] by applying the sigmoid function $$g(b) := \frac{1}{1+\exp(-b)}, \quad (21)$$

and use the result as the parameter q of a Bernoulli distribution with density $$\mathrm{Ber}(x|q):=q^x(1-q)^{1-x} \quad (22)$$

used to model the corresponding pixel $x_i$ in the image. This leads to the full equation $$p(x|B(c,m_k)) = \prod_{i=1}^{d_v} g(B_i(c,m_k))^{x_i}(1-g(B_i(c,m_k)))^{1-x_i}. \quad (23)$$

Grayscale Image:

in another example we model a vector x of value between 1 and some value N, for example grayscale images for which N=255. We then use the same sigmoid transformation of the output units, and use this image as the parameter of a Binomial distribution with second parameter N:

$$\mathrm{Bin}(x|q,N):=q^x(1-q)^{N-x}, \quad (24)$$

leading to the full equation $$p(x|B(c,m_k)) = \prod_{i=1}^{d_v} g(B_i(c,m_k))^{x_i}(1-g(B_i(c,m_k)))^{N-x_i}. \quad (25)$$

This image completion problem can be written as sampling from the distribution $p(x_h|x_v,c)$ using the learned GM p(x|c). For a single CMix model computing $p(x_h|x_v,c)$ is straightforward. From Equation (1) we get $$p(x_h|x_v,c) = \frac{\sum_k p(x_v,x_h|k,c)p(k|c)}{\sum_{x_h}\sum_k p(x_v,x_h|k,c)p(k|c)} \quad (26)$$

$$= \sum_k p(x_h|k,c)p(k|x_v,c), \quad (27)$$

where we have used the fact that the different pixels of the image are independent of each other given k and $p(k|x_v,c)$ is given by $$p(k|x_v,c) = \frac{p(x_v|k,c)p(k|c)}{\sum_j p(x_v|j,c)p(j|c)}. \quad (28)$$

The marginal observation likelihood $p(x_v|k,c)$ may be computed by simply ignoring the factors corresponding to the unobserved pixels in Equation (4). A procedure for sampling from the distribution $p(x_h|x_v,c)$ for a single CMix signal processor is detailed in Algorithm 5, below:

---

Algorithm 5 Completing missing data with CMix

---

1: function GENERATECOMPLETION($x_v$, c)
2:    for k ← 1 ... K do
3:       p($x_v$|k, c) ← $\Pi_{i \in v}$ p($x_i$|B(c, $m_k$))
4:    end for
5:    for k ← 1 ... K do
6:       $r_k$ ← p(k|$x_v$, c)
7:    end for
8:    k ~ Cat(r)
9:    $x_h$ ~ p($x_h$|k, c) = $\Pi_{i \in h}$ p($x_i$|B(c, $m_k$))

| Algorithm 5 Completing missing data with CMix |
| --- |
| 10:       $x \leftarrow (x_v, x_h)$ |
| 11:       return x, $m_k$ |
| 12: end function |

For a CMixChain signal processing system, the procedure is similar (although approximated). In this case, Algorithm 5 may be applied successively from the first level l=1 to the last level l=L, as detailed below in Algorithm 6:

| Algorithm 6 Completing missing data with CMixChain |
| --- |
| 1: function GENERATECOMPLETION($x_v$, c) |
| 2:     for l ← 1 ... L do |
| 3:         x, e ←CMix$^l$:GENERATECOMPLETION($x_v$, c) |
| 4:         c ← {c, e} |
| 5:     end for |
| 6:     return x |
| 7: end function |

4. Classification Via Learning Joint Distribution

An alternative form of classifier/imagining system may be implemented by training a CMix processor or chain on examples which include, together in the same example, an example and its label. Thus, for example, an image of an object may include text with the name of the object; or a label may be concatenated with a training example vector. The CMix processor/chain may then be trained on the joint examples and labels, thus learning to recreate the missing part of the example, imagining an object or providing a label classifying an object, in both cases thereby completing an input.

More generally, therefore, when learning labelled data, the Cmix processor/chain may be used to process a concatenation of the label and the object as the observation, and learn their joint distribution. Using the completion Algorithms described above then allows both imagination and classification in a unified manner.

Usefully, learning this joint distribution also allows for semi-supervised learning, i.e. learning from datasets where only certain objects are labelled and many others are not. This facilitates access to very rich sources of training data.

No doubt many other effective alternatives will occur to the skilled person. It will be understood that the invention is not limited to the described embodiments and encompasses modifications apparent to those skilled in the art lying within the spirit and scope of the claims appended hereto.

The invention claimed is:

1. A neural network system implemented as one or more computers for generating samples of a particular sample type, wherein each generated sample belongs to a respective category of a predetermined set of categories, and wherein each generated sample is an ordered collection of values, each value having a sample position in the collection, and wherein the system comprises:
    a first stochastic layer configured to stochastically select a category from the predetermined set of categories;
    a first deterministic subnetwork configured to:
        receive an embedding vector corresponding to the selected category, and
        process the embedding vector to generate a respective sample score for each sample position in the collection; and
    a second stochastic layer configured to generate an output sample by stochastically selecting, for each sample position, a sample value using the sample score for the sample position.

2. The neural network system of claim 1, wherein the deterministic subnetwork comprises a multilayer perceptron neural network.

3. The neural network system of claim 1, wherein the embedding vector corresponding to the selected category is a compressed representation of samples belonging to the category.

4. The neural network system of claim 1, further comprising:
    a second deterministic subnetwork configured to:
        receive a context vector that defines a context for a sample to be generated by the neural network system; and
        process the context vector to generate a score vector that comprises a respective score for each category in the predetermined set of categories, wherein the first stochastic layer is configured to stochastically select a category using the score vector.

5. The neural network system of claim 4, wherein processing the embedding vector to generate a respective sample score for each sample position in the collection comprises processing the embedding vector and the context vector to generate a respective sample score for each sample position in the collection.

6. The neural network system of claim 4, wherein the second deterministic subnetwork comprises a multilayer perceptron neural network and a softmax output layer.

7. The neural network system of claim 4, wherein the context vector is concatenation of an input context vector and a previous embedding vector for a category selected by a previous first stochastic layer.

8. The neural network system of claim 1, wherein the particular sample type is images, and wherein the categories correspond to objects depicted in the images.

9. One or more non-transitory computer storage media storing instructions that when executed by one or more computers cause the one or more computers to perform operations to implement a neural network system for generating samples of a particular sample type, wherein each generated sample belongs to a respective category of a predetermined set of categories, and wherein each generated sample is an ordered collection of values, each value having a sample position in the collection, and wherein the neural network system comprises:
    a first stochastic layer configured to stochastically select a category from the predetermined set of categories;
    a first deterministic subnetwork configured to:
        receive an embedding vector corresponding to the selected category, and
        process the embedding vector to generate a respective sample score for each sample position in the collection; and
    a second stochastic layer configured to generate an output sample by stochastically selecting, for each sample position, a sample value using the sample score for the sample position.

10. The computer storage media of claim 9, wherein the deterministic subnetwork comprises a multilayer perceptron neural network.

11. The computer storage media of claim 9, wherein the embedding vector corresponding to the selected category is a compressed representation of samples belonging to the category.

12. The computer storage media of claim 9, the system further comprising:
a second deterministic subnetwork configured to:
receive a context vector that defines a context for a sample to be generated by the neural network system; and
process the context vector to generate a score vector that comprises a respective score for each category in the predetermined set of categories, wherein the first stochastic layer is configured to stochastically select a category using the score vector.

13. The computer storage media of claim 12, wherein processing the embedding vector to generate a respective sample score for each sample position in the collection comprises processing the embedding vector and the context vector to generate a respective sample score for each sample position in the collection.

14. The computer storage media of claim 12, wherein the second deterministic subnetwork comprises a multilayer perceptron neural network and a softmax output layer.

15. The computer storage media of claim 12, wherein the context vector is concatenation of an input context vector and a previous embedding vector for a category selected by a previous first stochastic layer.

16. The computer storage media of claim 9, wherein the particular sample type is images, and wherein the categories correspond to objects depicted in the images.

17. A method for generating a sample of a particular sample type that belongs to a respective category of a predetermined set of categories, wherein the generated sample is an ordered collection of values, each value having a sample position in the collection, and wherein the method comprises:
stochastically selecting, using a first stochastic layer, a category from the predetermined set of categories;
processing an embedding vector corresponding to the selected category using a first deterministic subnetwork, wherein the first deterministic subnetwork is configured to:
receive the embedding vector corresponding to the selected category, and
process the embedding vector to generate a respective sample score for each sample position in the collection; and
generating an output sample using a second stochastic layer, wherein the second stochastic layer is configured to generate the output sample by stochastically selecting, for each sample position, a sample value using the sample score for the sample position.

18. The method of claim 17, wherein the first deterministic subnetwork comprises a multilayer perceptron neural network.

19. The method of claim 17, wherein the embedding vector corresponding to the selected category is a compressed representation of samples belonging to the category.

20. The method of claim 17, further comprising:
receiving a context vector that defines a context for a sample to be generated; and
processing the context vector using a second deterministic subnetwork configured to:
receive the context vector; and
process the context vector to generate a score vector that comprises a respective score for each category in the predetermined set of categories, wherein the first stochastic layer is configured to stochastically select a category using the score vector.

21. The method of claim 20, wherein processing the embedding vector to generate a respective sample score for each sample position in the collection comprises processing the embedding vector and the context vector to generate a respective sample score for each sample position in the collection.

22. The method of claim 20, wherein the second deterministic subnetwork comprises a multilayer perceptron neural network and a softmax output layer.

23. The method of claim 20, wherein the context vector is concatenation of an input context vector and a previous embedding vector for a category selected by a previous first stochastic layer.

24. The method of claim 17, wherein the particular sample type is images, and wherein the categories correspond to objects depicted in the images.

* * * * *